US008528000B2

(12) United States Patent
Schumacher et al.

(10) Patent No.: US 8,528,000 B2
(45) Date of Patent: *Sep. 3, 2013

(54) EXECUTION ENVIRONMENT FOR DATA TRANSFORMATION APPLICATIONS

(75) Inventors: Larry Lee Schumacher, Austin, TX (US); Agustin Gonzales-Tuchmann, Austin, TX (US); Laurence Tobin Yogman, Austin, TX (US); Paul C. Dingman, Leander, TX (US)

(73) Assignee: Pervasive Software, Inc., Austin, TX (US)

( * ) Notice: Subject to any disclaimer, the term of this patent is extended or adjusted under 35 U.S.C. 154(b) by 366 days.

This patent is subject to a terminal disclaimer.

(21) Appl. No.: 12/775,229

(22) Filed: May 6, 2010

(65) Prior Publication Data

US 2010/0262968 A1 Oct. 14, 2010

Related U.S. Application Data

(62) Division of application No. 10/700,281, filed on Nov. 3, 2003, now Pat. No. 7,743,382.

(51) Int. Cl.
*G06F 15/00* (2006.01)
*G06F 17/50* (2006.01)

(52) U.S. Cl.
USPC ........... 718/106; 712/235; 712/244; 712/217; 712/29; 703/14; 703/28

(58) Field of Classification Search
USPC .............. 712/235, 244, 217, 29, 1; 204/401; 703/14, 28; 718/106
See application file for complete search history.

(56) References Cited

U.S. PATENT DOCUMENTS

| | | | |
|---|---|---|---|
| 4,145,733 A | 3/1979 | Misunas et al. | |
| 5,313,454 A | 5/1994 | Bustini et al. | |
| 5,404,558 A | 4/1995 | Okamoto | |
| 5,499,349 A | 3/1996 | Nikhil et al. | |
| 5,517,656 A * | 5/1996 | Shi ................................. | 712/29 |
| 5,675,579 A | 10/1997 | Watson et al. | |
| 5,675,807 A | 10/1997 | Iswandhi et al. | |
| 5,764,976 A | 6/1998 | Hsiao | |
| 5,802,310 A | 9/1998 | Rajaraman | |
| 5,822,300 A | 10/1998 | Johnson et al. | |
| 5,914,953 A | 6/1999 | Krause et al. | |

(Continued)

OTHER PUBLICATIONS

Office Action mailed Mar. 8, 2007 for U.S. Appl. No. 10/700,254.

(Continued)

*Primary Examiner* — Thomas Lee
*Assistant Examiner* — Aurel Prifti
(74) *Attorney, Agent, or Firm* — Charles D. Huston; Daffer McDaniel LLP

(57) ABSTRACT

The execution environment provides for scalability where components will execute in parallel and exploit various patterns of parallelism. Dataflow applications are represented by reusable dataflow graphs called map components, while the executable version is called a prepared map. Using runtime properties the prepared map is executed in parallel with a thread allocated to each map process. The execution environment not only monitors threads, detects and corrects deadlocks, logs and controls program exceptions, but also data input and output ports of the map components are processed in parallel to take advantage of data partitioning schemes. Port implementation supports multi-state null value tokens to more accurately report exceptions. Data tokens are batched to minimize synchronization and transportation overhead and thread contention.

9 Claims, 33 Drawing Sheets

(56) References Cited

U.S. PATENT DOCUMENTS

| | | | |
|---|---|---|---|
| 5,999,729 | A | 12/1999 | Tabloski, Jr. et al. |
| 6,031,835 | A | 2/2000 | Abali et al. |
| 6,058,466 | A | 5/2000 | Panwar et al. |
| 6,088,716 | A | 7/2000 | Stanfill et al. |
| 6,223,207 | B1 | 4/2001 | Lucovsky et al. |
| 6,311,265 | B1 | 10/2001 | Beckerle et al. |
| 6,330,008 | B1 | 12/2001 | Razdow et al. |
| 6,378,066 | B1 | 4/2002 | Lewis |
| 6,424,624 | B1 | 7/2002 | Galand et al. |
| 6,449,619 | B1 | 9/2002 | Colliat et al. |
| 6,449,711 | B1 | 9/2002 | Week |
| 6,631,460 | B1 * | 10/2003 | Morris et al. ............. 712/217 |
| 6,874,141 | B1 | 3/2005 | Swamy et al. |
| 6,947,947 | B2 | 9/2005 | Block et al. |
| 6,993,753 | B2 | 1/2006 | Yamanaka et al. |
| 7,095,852 | B2 | 8/2006 | Wack et al. |
| 7,124,405 | B1 | 10/2006 | Kakivaya et al. |
| 7,173,901 | B2 | 2/2007 | Pauwels et al. |
| 7,197,582 | B2 | 3/2007 | Chelcea et al. |
| 7,840,949 | B2 | 11/2010 | Schumacher et al. |
| 2001/0025238 | A1* | 9/2001 | Kitajima et al. ........... 703/28 |
| 2002/0010851 | A1* | 1/2002 | Morris et al. ............. 712/244 |
| 2002/0178432 | A1* | 11/2002 | Kim et al. ................. 716/18 |
| 2003/0023656 | A1 | 1/2003 | Hutchison et al. |
| 2003/0135722 | A1* | 7/2003 | Johnson .................... 712/235 |
| 2003/0212814 | A1 | 11/2003 | Tzeng et al. |
| 2004/0025164 | A1 | 2/2004 | Ma et al. |
| 2004/0181385 | A1* | 9/2004 | Milne et al. ............... 703/14 |
| 2005/0097561 | A1 | 5/2005 | Schumacher et al. |
| 2007/0006198 | A1 | 1/2007 | Kakivaya et al. |
| 2008/0052687 | A1 | 2/2008 | Schumacher et al. |
| 2010/0025238 | A1* | 2/2010 | Gottlieb et al. ............ 204/401 |

OTHER PUBLICATIONS

Office Action mailed Sep. 10, 2007 for U.S. Appl. No. 10/700,254.
Final Office Action mailed Jun. 11, 2008 for U.S. Appl. No. 10/700,254.
Office Action mailed Aug. 18, 2009 for U.S. Appl. No. 10/700,254.
Notice of Allowance mailed Jun. 14, 2010 for U.S. Appl. No. 10/700,254.
Office Action mailed Jan. 10, 2007 for U.S. Appl. No. 10/700,152.
Final Office Action mailed Jan. 10, 2008 for U.S. Appl. No. 10/700,152.
Examiner's Answer mailed Apr. 15, 2009 for U.S. Appl. No. 10/700,152.
Linden, "Structured Document Transformations," University of Helsinki, 1997, pp. 1-122.
Wallace et al., "Haskell and XML: Generic Combinators or Type-Based Translation," Proceedings of 4th ACM SIGPLAN Int'l Conf. on Functional Programming, Sep. 1999, vol. 34, No. 9, pp. 148-159.
Lee et al., "Dataflow Architectures and Multithreading," IEEE, 1994, pp. 27-39.
Minas et al., "Cyclic Debugging for Psather, a Parallel Objected-Oriented Programming Language," International Computer Science Institute, 1994, pp. 1-9.
Som et al., "Prediction of Performance and Processor Requirements in Real-Time Data Flow Architectures," IEEE Transactions on Parallel and Distributed Systems, vol. 14, No. 11, Nov. 1993, pp. 1205-1216.
Oh et al., "Efficient Code Synthesis from Extended Dataflow Graphs for Multimedia Applications," Jun. 2002, 6 pages.
Stevens et al., "Implementation of Process Networks in Java," Jul. 1997, pp. 1-14.
Parks et al., "Distributed Process Networks in Java," Apr. 2003, pp. 1-8.
Dewitt et al., "Parallel Database Systems: The Future of High Performance Database Systems," Communications of the ACM, Jun. 1992, vol. 35, No. 6, pp. 85-98.
Kozuka et al., "Component-Based Visual Programming Environment for Cooperative Software Development," Hitachi Review, vol. 45, No. 2, Apr. 1996, pp. 75-80.
Kilgore, "Silk, Java and Object-Oriented Simulation," Simulation Conference Proceedings, vol. 1, No. 10, Dec. 2000, pp. 246-252.
Sun Microsystems, JavaBeans™ API Specification Version 1.01, Jul. 1997, pp. 9-15.
Buck, "Static Scheduling and Code Generation from Dynamic Dataflow Graphs with Integer-Valued Control Streams," Signals, Systems and Computers Conference, vol. 1, Oct. 1994, pp. 508-513.
Park et al., "A Periodic Deadlock Detection and Resolution Algorithm with a New Graph Model for Sequential Transaction Processing," © IEEE 1992, pp. 202-209.
International Search Report, PCT/US2004/036554, mailed Mar. 18, 2005.

\* cited by examiner

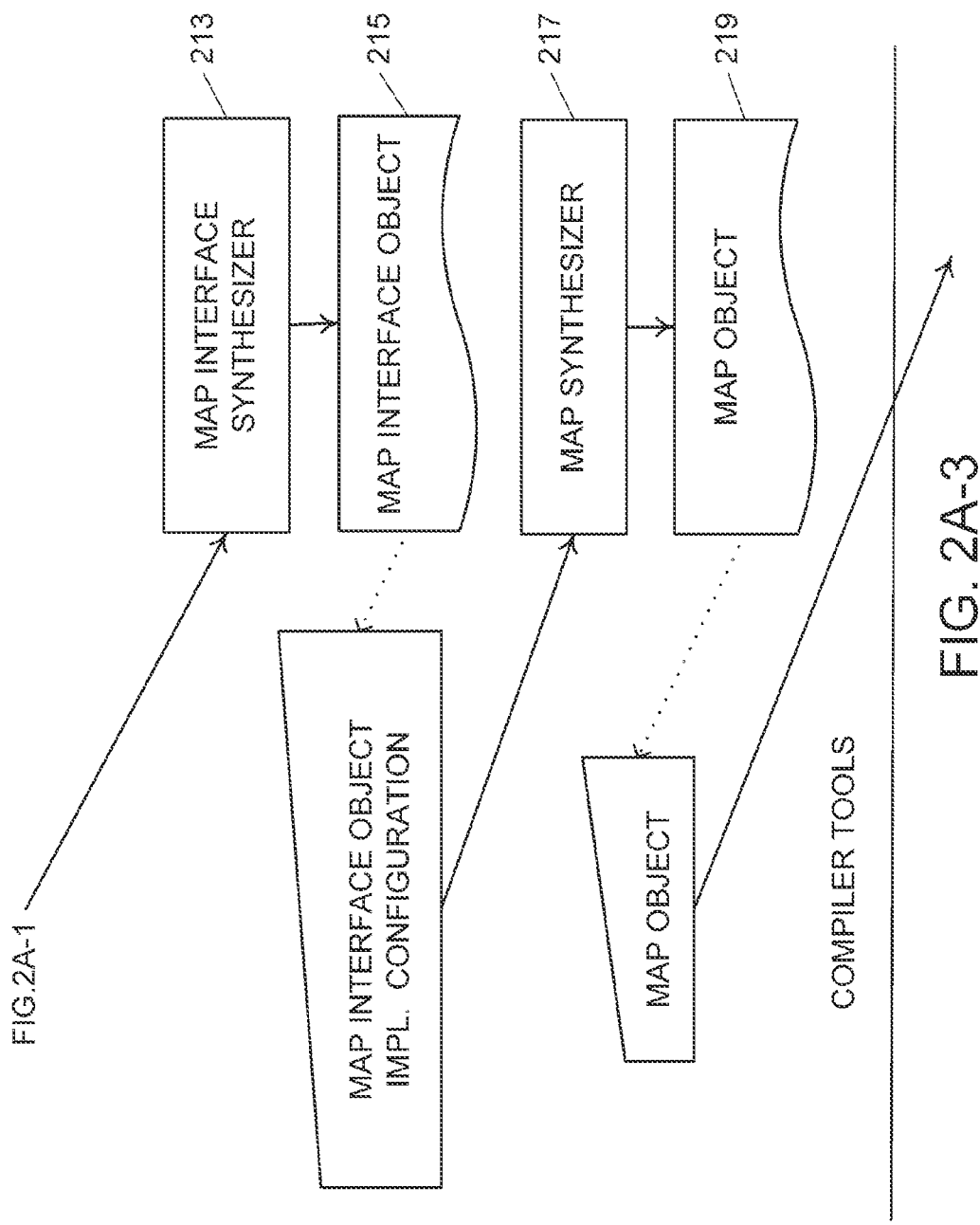

Join Example

EXECUTION ENVIRONMENT FOR DATA TRANSFORMATION APPLICATIONS

CONTINUING DATA

The present application is a divisional from prior U.S. patent application Ser. No. 10/700,281 filed Nov. 3, 2003.

BACKGROUND OF THE INVENTION

1. Field of the Invention

The present invention relates to a system and method for managing data which includes data transformation, such as data warehousing, data analysis or similar applications. In particular, the invention relates to an execution environment where reusable map components will execute in parallel and exploit various patterns of parallelism.

2. Description of the Related Art

The following descriptions and examples are not admitted to be prior art by virtue of their inclusion within this section.

Business processes are collecting ever-increasing amounts of data. The number of interaction points where data is collected is increasing and the amount of data collected at each point is increasing. Collected data is being retained for longer periods of time resulting in continual database growth. Data processing in a business process takes a variety of forms, such as data warehousing, decision support software, analytical software, customer relationship management. Such data processing invariably involves transforming the data for use.

Business processes are also increasingly going "real-time." This trend has an interesting side effect. As business processes become more dependent on near continuous refresh of data, they become less tolerant of transition periods.

Refresh transition occurs when the data changes. Multiple, related sets of data from multiple sources must be refreshed in a consistent manner with respect to time. The more dependent business processes are on up-to-date data, the smaller the time windows for updates. Decreasing time windows in conjunction with increasing amounts of data presents a process execution scalability problem.

Schema transition occurs when the type of data collected changes. Business processes and partnerships evolve and integrate in unpredictable ways. The more dependent business processes are on up-to-date data, the smaller the time windows for implementing change. That is, scalability is not limited by physical storage of data, but by applications to transform the data for business use. This presents a process development scalability problem, as well as an execution scalability problem. The challenge then is to lower the cost of development of data routing and transformation applications while at the same time, providing scaleable execution environments to respond to the ever increasing data flows and shrinking response time windows.

Dataflow graphs are widely recognized as an effective means to specify data processing software. Their value lies in the succinct presentation and explicit definition of data transfers as the data progresses through a chain of transformation processes. Such dataflow graphs typically represent transformation processes as nodes having input and output ports, with the connections between nodes represented by arcs specifying sources and destinations for data transfer. The nodes may be hierarchical, with a single node at a high level representing a summary of a dataflow graph which can be decomposed into lower-level nodes and arcs, until primitive data transformations are presented at the lowest level of the hierarchy. The dataflow representation is found to be especially apt for multi-threaded execution environments such as parallel processing.

With the wider availability of parallel processing, such as shared-memory multiprocessor (SMP) machines, clustered or distributed machines connected by networks, and single CPU machines executing multiple threads, the need for cost-effective and time-efficient programming methods for such execution environments is becoming increasingly important. The current state of the art in computer architecture design is shifting towards hyper-parallel computing. All the major CPU providers have embraced two trends, hyper-threading, and multiple core chips.

Hyper-threading is the ability for a single CPU core to execute multiple threads simultaneously by interleaving them in the hardware's instruction pipeline. The typical CPU instruction pipeline has grown in length such that a single thread cannot keep the pipeline full. Interleaving instructions from multiple threads is the logical next step.

Multiple core chips are the result of ever increasing chip real estate due to shrinking circuit size. It is equivalent to shrinking a multiple processor SMP server onto a single piece of silicon. For example, Sun Microsystems plans to have a single chip with 8 cores, with each core capable of executing 4 threads simultaneously. This is the equivalent of a 32-processor machine on 1 chip. This would enable a 64-processor machine to execute 64*32=2048 threads in parallel. Server hardware performance is set to expand rapidly for those applications that can take advantage of hyper-parallel computing.

As used herein, "multi-threading" is intended to include multiple core architectures, i.e. a distinction is not made between parallel processing architectures such as SMP machines or a single CPU machine executing multiple threads. The current invention is applicable to all parallel processing architectures, e.g. a "thread" might be a process on a CPU in a multi-core SMP machine.

The future of data integration will require both scalability in process execution and also scalability in process development. Parallel processing is a primary approach to execution scalability yet it typically increases the complexity of development. The paradox arises from the requirement of developing robust, complex, parallel applications in ever diminishing time frames.

Since they are found to be effective, dataflow graphs have been used for both the specification and design of computer software as well as for documentation, user application training, and supporting code maintenance or modification activities. Further attempts have been made to use dataflow graphs as the basis for code synthesis. The goal has been to design the software using the dataflow graph representation and then use the resulting graphs to synthesize code for execution by associating software library functions in imperative languages or objects in declarative languages with the nodes of the dataflow graph. Difficulties encountered with prior implementations are limited flexibility/expressive power in component linking such that 1) Not all repeating dataflow patterns can be encapsulated in reusable components such that end users quite often have to "reinvent" those patterns in each application. 2) Sub-partitioning hierarchical dataflows becomes prohibitively expensive when attempting to utilize alternative dimensions of parallelism.

The result has been that while dataflow graphs are widely used for system specification and design, and attempts have been made to synthesize code from such dataflow graphs, the two goals of process development scalability and process execution scalability have yet to be simultaneously achieved.

Previous attempts to synthesize code directly from dataflow graphs achieve execution scalability but do so only in limited cases where the dimensions of parallelism exploited match well with the limited degrees of parallelism exposed.

Many real world cases are excluded due to the limited flexibility/expressive power in component linking thus impacting reuse and ultimately development scalability.

Alternatively the production code is sometimes written in a separate process from the dataflow design stage. Such an approach is acceptable if the pace of business process change is slow enough to allow high-performance production code to be written, by hand, after the system design is complete.

There exists, however, a significant and growing class of data intensive high-performance applications where both approaches above are unacceptable. That is, there is a significant class of applications for which the delay between requirements change and working high-performance implementation must be minimized. These are the applications that are based on the growing flood of real-time data. When schema transition of real-time data occurs, the business processes dependent on that data cannot go off-line. New implementations, based on the new schema, must be available. The development of high-performance production code must not become the bottleneck in real-time business process change. In these cases, both the cost and time for creation of the code and its execution time must be held to a minimum. To minimize the cost and time of code creation, a generic hierarchical dataflow representation of the system must be retained at design time. This representation must be then be automatically transformed into a parallel, type-specific, non-hierarchical representation for efficient execution.

An example of a dataflow graph development system is found in U.S. Pat. No. 5,999,729. An example of a deadlock resolution system in a multi-threaded environment is found in U.S. Pat. No. 6,088,716. Deadlock detection and correction in process networks are known, see, R. Stevens, M. Wan, P. Laramie, T. Parks & E. Lee, *Implementation of Process Networks in Java*, www.ait.nrl.navy.mil/pgmt/PNpaper.pdf, July 1997. An example of a parallel programming environment is found in U.S. Pat. No. 6,311,265. All references cited herein are incorporated by reference.

It would therefore be a significant advantage if the cost-effectiveness of the graphical dataflow representation for design could be used to synthesize executable code with performance adequate for short-term production.

SUMMARY OF THE INVENTION

The problems with the synthesis of computationally efficient data transformation applications from dataflow graphs outlined above are addressed by the system and methods provided herein. The system and method herein provides for dataflow application development particularly suited for parallel architectures when the synthesis process is decomposed into a sequence of steps. The systems and methods hereof are particularly useful when data must be processed or examined quickly and efficiently and scalability in design as well as execution is important.

The system and methods described herein center on the decomposition of the synthesis task into a sequence of steps such that a dataflow application is not generated immediately from a map component which has been created by the application designer. Rather, the designer works with a map component editor which manipulates iconic objects by using graphical and text editors and importing map components from libraries of existing maps. Some of these map components may be encrypted, third party data transformations. These iconic map components do not present the user with the internal details of the maps which are imported from the library, nor the properties of new map components as assembled by the user. In this way, the application designer is relieved of the task of tracking and specifying low-level details which are not needed at this stage of the synthesis process. The output from this step of the user design activity is, thus, a hierarchical map appropriate to the desired data processing task, but without low-level details of implementation.

Broadly speaking the invention contemplates a method for executing a dataflow application comprising a plurality of map components and data ports, a number of map components being linked between data ports and each map component comprising one or more processes. A processing thread is allocated to each a respective process and the multiple processes are executed in parallel. Preferably, certain map components include input ports and output ports and the executing step includes reading data tokens from respective input ports and writing data tokens to respective output ports. The port implementations may be a specific data type or a generic data type and some of the ports may be hierarchical comprising a plurality of hierarchical ports with the data partitioned for parallel processing.

The invention also contemplates a method of deadlock management in a multi-thread, parallel processing data management system having ports for sending and receiving data tokens comprising where at least one thread is allocated to a first process and at least one thread is allocated to a second process with the first and second processes are connected through a queue via ports. The method determines if a thread is blocked and waiting on another thread and determines if the blocked thread is sending data or receiving data. The method then determines if a deadlock exists by building a wait graph of blocked threads in the system and determining if the graph is cyclic, that is waiting on itself, indicating a deadlock does exist. In a correction mode, if a deadlock is detected the deadlock is corrected by allowing the limit of data tokens on a queue to increase. In a preferred form, the limit of a queue associated with a sending port is allowed to increase. In another preferred embodiment, the token batch size of another queue is decreased while the limit of the other queue is increasing.

In another form, the invention contemplates a dataflow application having multiple processes connected by data input and output ports where at least some ports are implemented to indicate multiple state null value data tokens. Preferably, the multiple state null value port operations support at least three state logic. In another form, the multiple state null values support at least a system defined error null token.

BRIEF DESCRIPTION OF THE DRAWINGS

Other objects and advantages of the invention will become apparent upon reading the following detailed description and upon reference to the accompanying drawings in which:

FIG. 2A is a flow diagram showing the creation and re-use of components, while

Figure 1:
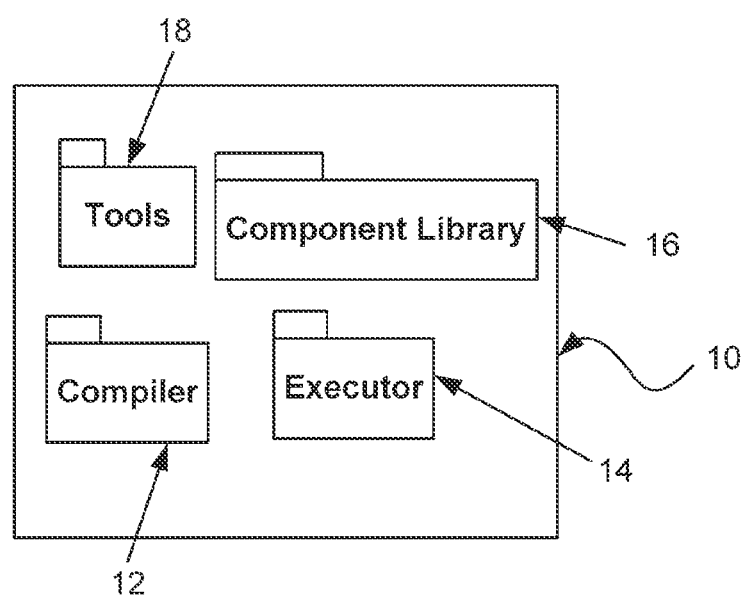
FIG. 1 shows a block diagram of a data management system in accordance with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

I. Overview

A. Architecture

The data management system of the present invention uses component architecture to manage the complexity of development and maintenance of dataflow applications. It also uses compiler techniques to transform the components into a form that enables efficient, parallel, execution. More explicitly, all dataflow applications created by developers using the data management system are assembled either of components created internally or from components delivered by a third party.

Data management system 10 has four packages (see FIG. 1): the compiler 12, a set of low level programmatic tools for the development and maintenance of the components; the executor 14, a set of low level tools for high performance execution of parallel dataflow applications; a component library 16, a repository for system, internal, and third party components; and finally a set of high level programmatic, command line and GUI tools 18 to facilitate access to the functionality of the compiler, the executor, and the component library.

Data management system 10, as a component based development framework supports both extensibility and re-use of components. Extensibility means the ability to add new components without having to neither change nor recompile existing system code or the code of existing components. Re-use means the ability to use existing components when building new components or applications. In the data management system, a dataflow application is also a component. Thus, in the data management system, re-use means the ability to use existing components when creating new components (this is also known as composition). The data management system offers a declarative language application programming interface ("API") to build components as well as a host language class library to customize components and to develop and execute new components.

Data management system 10 requires, in addition to its own packages, a host language development environment (currently Java), a third party environment required to develop the host language components as needed (in many useful cases, new map components will not require the development of host language components). Thus, the data management system's development and execution environment is a hybrid of provided tools and languages and the host language development environment.

In data management system 10, either flat dataflow graphs or composite dataflow graphs are used to represent dataflow applications. The data management system calls such composite dataflow graphs "maps." Thus, a map is a composite dataflow graph whose internal nodes denote composite transformations and nodes at the leaves denote atomic transformations. Parent to child edges denote component ownership and port to port edges denote dataflow links.

The composite transformations are encapsulated into map components using a declarative, proprietary language. The atomic transformations are encapsulated into host language components (i.e. Java beans in the current implementation). Thus, another way to think of a map in the data management system is as an assembly of map components and host language components. It should be evident that because the map is a component itself, the composition of maps is also a component. Therefore, data management system 10 supports arbitrary composition levels and map's internal structure is, in general, a tree of sub-maps.

However, map components in the data management system can represent more than simply static intermediate levels of composite dataflow graphs. In general, they are powerful, easy to use, configurable specifications of families of transformations (i.e. map families). That is a map component can potentially encapsulate an infinite set of related maps and to choose a given map, the map component user must bind the component's properties to appropriate values.

The map component is a configurable specification of a hierarchical dataflow map family. A map component will have in general two lists of properties: interface properties and implementation properties. These properties are the "configuration knobs" that allow users to tweak given map components to get exactly the map they need. These properties ultimately control behavior of logic expressed in the host language (i.e. Java) which in turns customizes the statically declared partial structure of a given map interface and implementation.

The combination of a statically declared interface and implementation plus configurable logic allows encapsulating a potentially infinite set of related hierarchical maps. However, supporting this configurable logic forces a lifecycle where the final hierarchical map is produced in a multi step fashion The priorities of the Data Management System hereof are:
Integrity of resulting code;
[1] Computational speed at execution time;
[2] Complexity hiding;
[3] Supporting ease of re-use;
[4] Security;
[5] Ease of use.

Figure 2A:
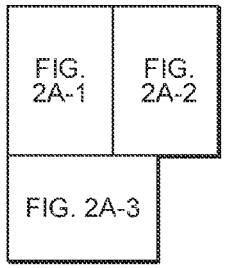
Figures 1, 2A:
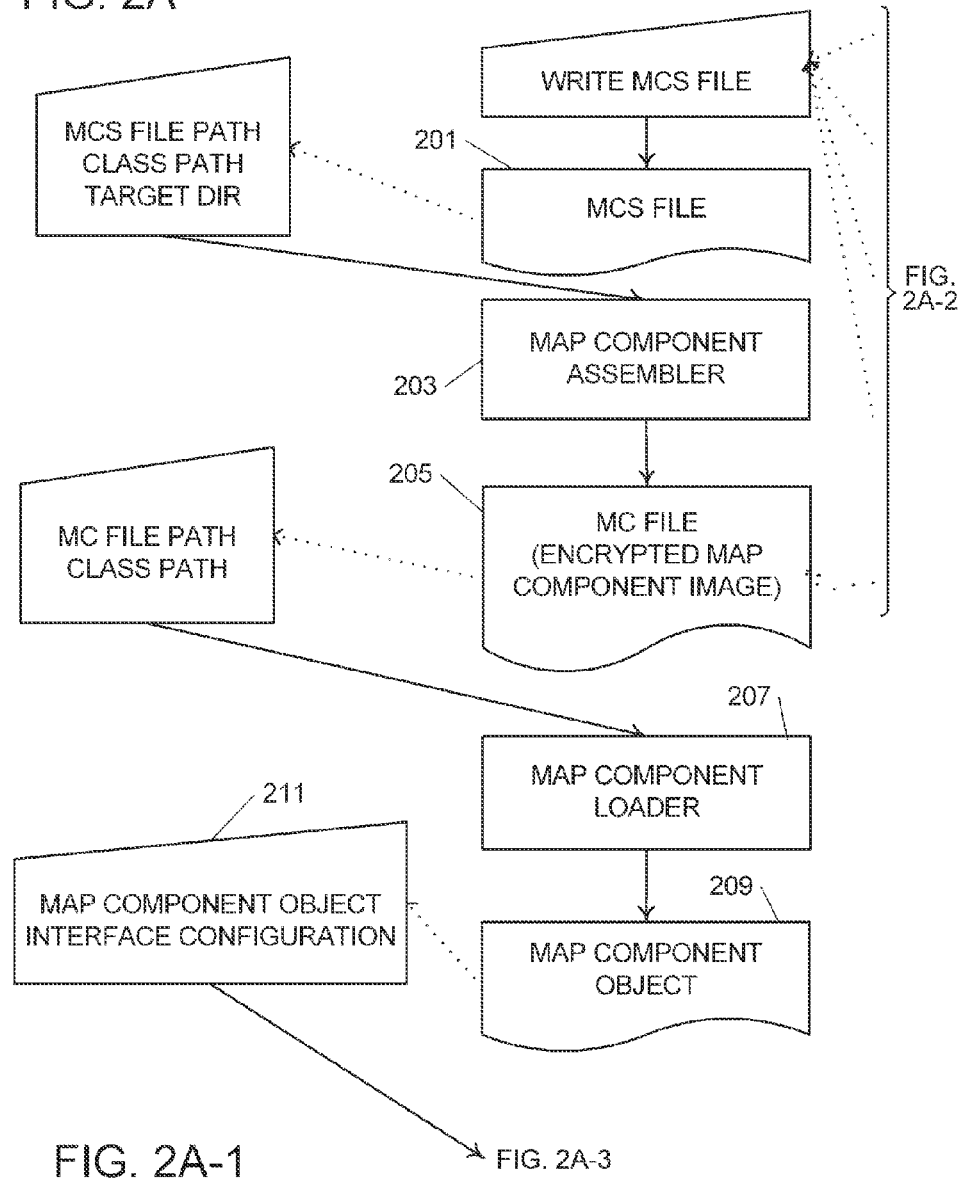
Figures 2, 2A:
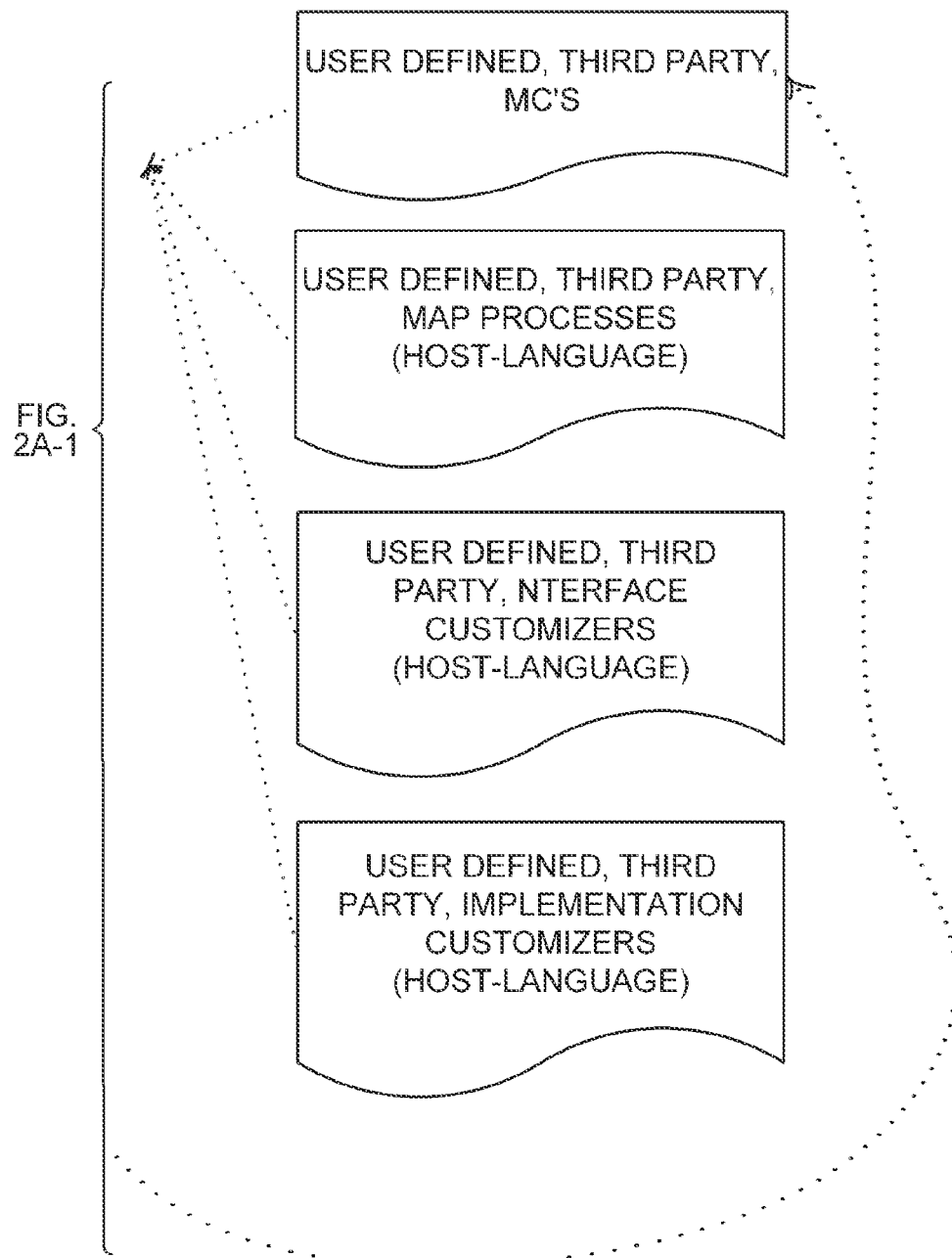
Figure 2B:
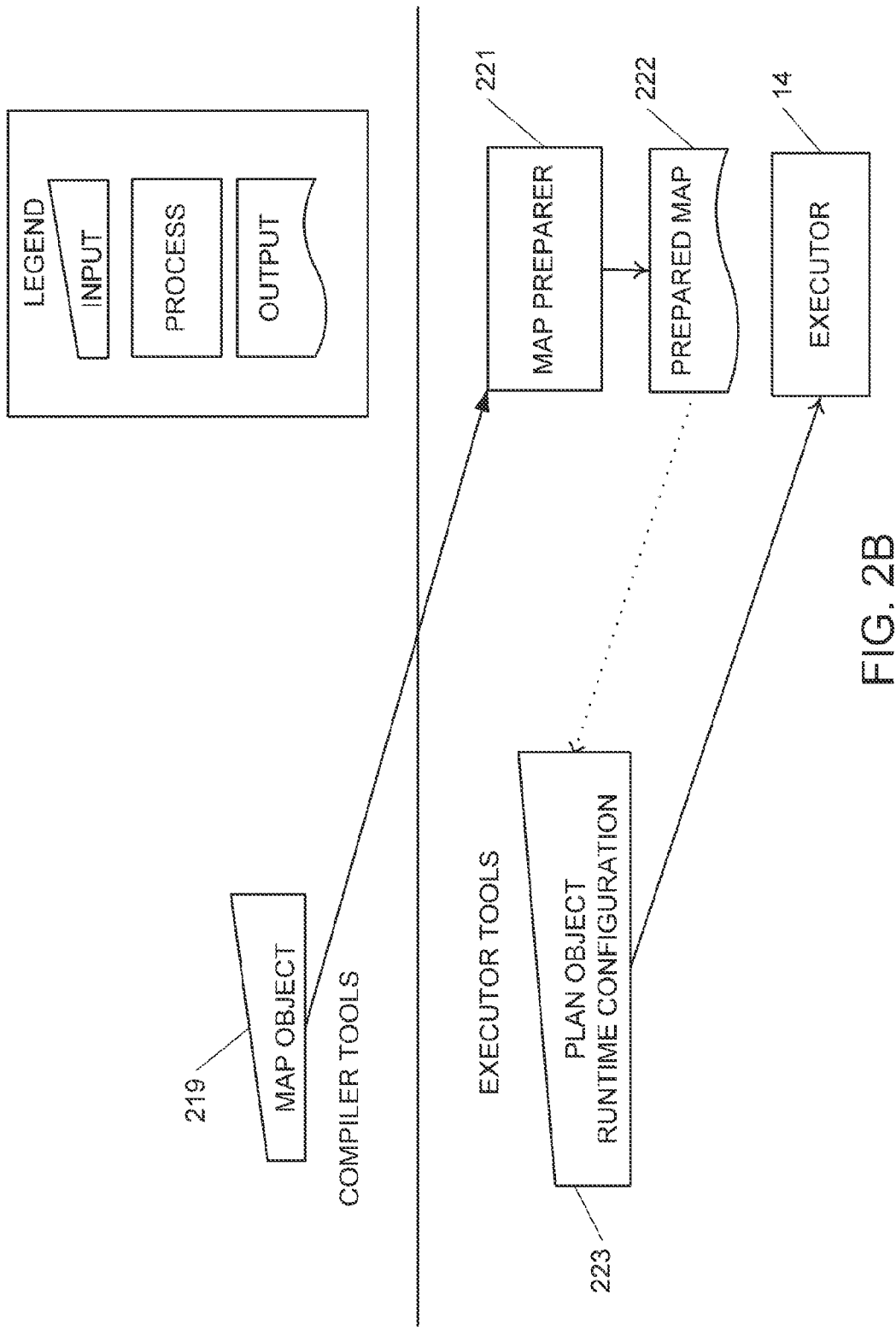
FIG. 2B is a connected flow diagram showing the execution of a dataflow diagram.

FIGS. 2A and 2B summarize the lifecycle of the creation and execution of a dataflow application in accordance with a preferred embodiment of the present invention and are useful in understanding the high level architecture hereof. A map component lifecycle starts when the map component developer creates a map component source ("MCS") (MCS file 201), an XML file (FIG. 2A). The MCS file can represent a family of one, in which case the specification is a declarative program indicating a complete dataflow graph, or a family of N, in which case the specification has a declarative part and another part composed of configurable host language procedural components. In any case, the finalized MCS file 201 is a configurable specification that, given particular bindings of available properties, indicates how internal components are linked to obtain a final, complete, dataflow graph, i.e. a "map."

When the developer is done creating the MCS file, then a tool called "map component assembler" 203 is used to generate a map component file ("MC") (MC file 205), also an XML file, which contains a clear text documentation section as well as an encrypted section. MC files 205 are the encrypted image of map components. MCS files 201 cannot be used directly to drive the data management system engine. MC files 205 are used instead. Once an MC file 205 is created, its MCS file 201 is no longer required in all sub-sequent lifecycle processes. Thus, in a way, MCS files are to mc files what java source files are to java class files.

As shown in FIG. 2A, MC files 205 are loaded using the "map component loader" 207 along with a class path used by the loader to find internal components. The loader produces a map component object 209.

The map component object 209 encodes a family of maps and needs to be configured to produce the required map. The map component offers in its documentation and properties section information on how to configure it in order to get the desired map (i.e. at 211). The first step in obtaining the map is to obtain the appropriate "map interface," i.e. the object that describes which ports the final map will have. For this purpose, the developer uses the map component object 209, along with a list of interface-property-name/interface-property-value pairs, as input to the "map interface synthesizer" tool 213. This tool then generates the "map interface object" 215 corresponding to the given map component object/interface configuration input. The "map interface object" now can be queried to learn about its ports. If the developer is not satisfied with the ports then she reconfigures the map component object and re-synthesizes its map interface until satisfied.

If the developer is satisfied then she proceeds to generate the final map. Thus, she gives the map interface object 215 along with a list of implementation-property-name/implementation-property-value pairs, to the "map synthesizer" tool 217. The map synthesizer 217 then validates that all internal links among internal components generated by the given implementation configuration are correct semantically and syntactically. Some of the tests done are with respect to linking semantics (i.e. an input cannot be linked from two source outputs, etc.) and with respect to port type semantics (i.e. a string port type cannot be linked to a long port type). The map synthesizer 217 also does port type propagation whenever two port types are linked polymorphically (i.e. a long port type when linked to a generic port type causes the generic to be transformed to long). If the map synthesizer 217 encountered no errors it then outputs a "map object" 219.

The map object 219 contains a concrete, complete, correct, map. The developer can query the map object with respect to its ports as well as its implementation. The map component displays this information in XML format. Note that a map component developer may have directed the data management system not to expose a map implementation when she built its MCS file 201. If the map component from which the map is derived is open, then the map object 219 will show its implementation as well as the implementation of all open internal maps.

The map object 219 is the last object produce by the design time tools (a/k/a compiler tools, see, e.g. FIG. 1, Compiler 12). Therefore, the design time tools are: map component assembler 203, map component loader 207, map interface synthesizer 213, and map synthesizer 217. For execution, two more tools, explained below, are needed.

If the map represented by the map object 219 has no inputs or outputs then it is a "dataflow application" and can be executed. However, before it can be executed it has to be "prepared" by passing it to the "plan preparer" 221, another tool (FIG. 2B). The plan preparer 221, if everything is ok, then produces a "prepared map object" 222. The prepared map object 223 can then be queried with respect to which runtime properties it supports. To proceed with execution the user then gives the prepared map object along with a list of runtime-property-name/runtime-property-value pairs to the executor 14.

The executor 14 then proceeds to create its internal data structures to support scheduling of each map process in the plan in its own thread, to automatically create and manage high performance, typed, queues for dataflow communication channels among map process executor ports, as well to automatically manage deadlock detection and resolution (the actual transformation procedures happen in the map process host language components, i.e. java beans. Map process developers need never worry about concurrent/parallel programming constructs and pitfalls since the executor 14 manages that for them). When the executor 14 is done, control is returned to the calling client code, which can re-configure the prepared map object and execute the new configuration again.

B. Functionality

Conceptually, in the dataflow model of computation, an application is always organized as a graph. The nodes of the graph are data transformation processes that have input and output ports. The edges are data pipes that connect output ports to input ports.

Dataflow is the industry standard architecture for achieving scalability of applications with respect to added computing power. This has been refined into a set of patterns, ideas, and engineering practices known as "component based development." In this view, applications are assembled from a set of pre-existing "components."

Conceptually, component based development partitions an application into loosely coupled "components." The components have "properties" that are bound to values that make sense to the particular application and in turn configure the component to function as desired. Additionally, the components are assembled following a pre-defined set of "composition" rules. Component based development is the industry standard architecture for lowering the cost of application development.

A synergy exists between dataflow and component architectures. Dataflow graphs can be organized using the "composite pattern." Once a composite pattern is formed, then every level of a composite dataflow graph can be encapsulated into its own component. Thus, a dataflow component is simply a specification of a certain level of a dataflow graph. The properties of such a component then become ways to customize the graph at that level. The port to port links from higher levels to the particular level being encapsulated become the ports of the component.

Once a composite dataflow level has been encapsulated into a component it can be used as black box re-use in any other dataflow composite graph. The examples in FIGS. 15-29 illustrate these concepts.

The potential synergy between component architectures and execution scalability when using dataflow is striking Prior dataflow systems either failed to see that connection or had other reasons not to fully realize it. As a result, such prior dataflow systems are not balanced: sometimes they stress ease of development while other stress execution scalability.

On the other hand, data management system 10 of the present invention has a framework with the following attributes:

Ease of re-use of dataflow transformations
Ease of assembly of components
Low usage of memory and other operating system resources
Standards based implementation
Operating system portability
High performance, system managed parallel, execution The first two priorities address the need for lowering development costs and time to market pressures. The next three address the need for heterogeneous system support and low cost of ownership, and the last one addresses the need for high performance.

The data management system engine supports ease of assembly, re-use, compile time validation, and high performance execution. Surprisingly, most architectural choices actually produced a positive feedback of re-use/ease-of-use/high performance (composite ports, hierarchical composition of components exists only at compile time, strong type system, etc.).

As a result, the data management system simultaneously solves the problem of development scalability and that of execution scalability for dataflow applications.

Data management system 10 provides an environment where a component called a map can easily be composed from other components and all components run in parallel. Map linking is flexible such that entire hierarchical composite ports can be linked with a single action, or each individual scalar port can be individually linked, or any combination in between. Flexibility in map linking provides for multiple dimensions of parallelism to exploit. It also promotes reuse via encapsulation of sub-schema transformations.

Maps have the flexibility to synthesize internally after properties are specified and all input port types are synthesized via links to other map's ports. This synthesis capability gives a map the luxury of delaying the decision of how best to exploit any dimension of parallelism until after it's been fully informed of the types of data it will process. The end result are maps that can parallelize themselves based on the data types being processed, without the intervention or knowledge of the user of the map.

Maps can also behave like templates to take advantage of macro dimensions of reuse and parallelism. For example, this allows for sub-maps to be replicated for processing very large partitioned datasets in parallel. The end result is maps that exploit multiple dimensions of parallelism simultaneously. Horizontal (hashed key, range key, etc) partition parallelism, vertical (column or element) partition parallelism, and pipeline parallelism.

Data management system 10 is a hyper-parallel computing architecture that embraces component reuse, extensibility, and strongly typed design time composition. The end result is scalable process development and scalable process execution.

II. Detailed Description

A. Design and Compilation

The data management system offers tools for creation and re-use of components as well for execution of dataflow applications. FIGS. 2A and 2B summarize the complete lifecycle.

Figure 3:
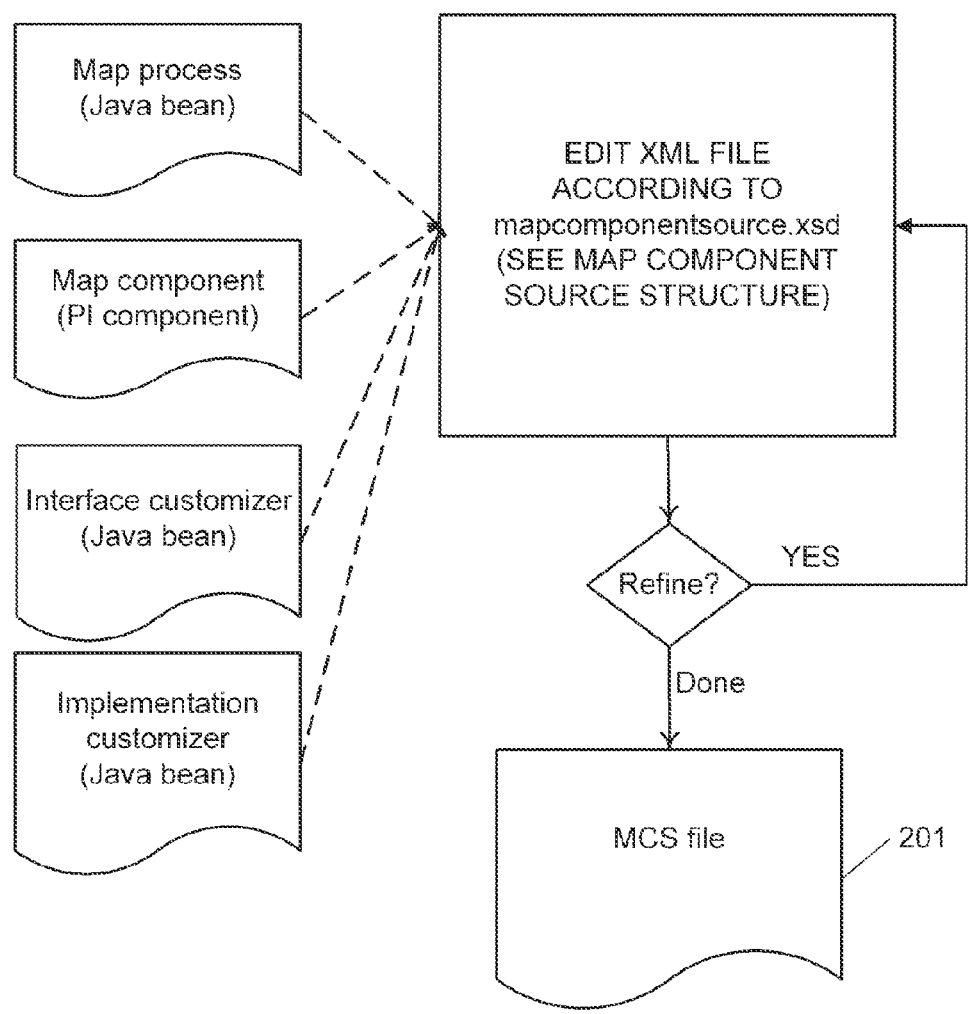
FIG. 3 is a flow diagram illustrating creation of a map component source.
Figure 4:
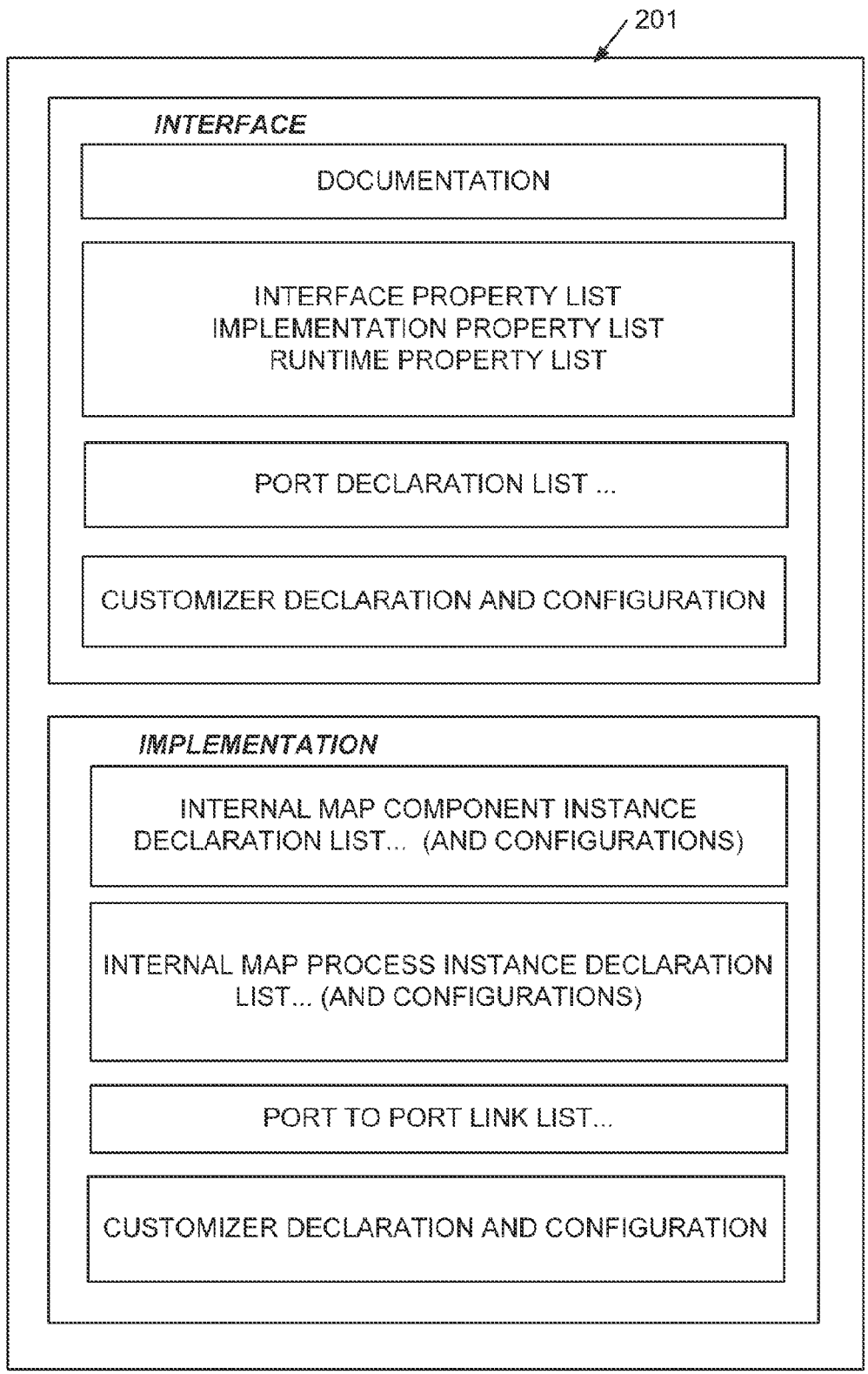
FIG. 4 is a block diagram showing the structure of a map component source.

The map component source creation and lifecycle is illustrated in detail in FIGS. 3 and 4. In creating map component source ("MCS") 201 the developer creates the configurable specification for a particular map family according to the requirements.

Because the MCS 201 is an XML document, the developer can write it using a simple text editor. However, MCS creation and editing is also amenable to the use of a graphical editor that visually performs the steps.

While FIG. 3 illustrates the process of source creation, FIG. 4 illustrates the structure of an MCS 201 document. The documentation section of FIG. 4 is for the developer to document bookkeeping information about the component. Items such as author, description of the component, date created, etc. go here.

The properties section of FIG. 4 defines the configurable properties that the MCS 201 will expose. There are three types of properties: interface properties, implementation properties, and runtime properties. Properties can be any of the usual scalar types (string, int, float, etc.). The interface properties are basically the properties that will be delegated to the interface customizer for the map component. These properties will affect the structure of the map component's interface (see below).

The implementation properties are basically the properties that will be delegated to the implementation customizer for the map component. These properties will affect which internal components or port-to-port links will be dynamically added to the generated map. Implementation properties can also be delegated to internal components, the components of the implementation.

The runtime properties are delegated to internal map component's runtime properties or to internal map process properties. These properties are used in the procedural code embedded in the map process for runtime decisions.

When writing the source for a map component, the developer needs to specify the structure of the ports for the particular dataflow map family that the component represents. The ports can be scalar or composite.

Sometimes, the full interface for the map component cannot be known statically, at source creation time (for instance, a map component that reads SQL tables cannot decide the full structure of its output port only after it knows the particular table it is reading). In this case, the developer specifies all that is known about the interface at design time and leaves the rest of the specification to procedural code embedded in an interface customizer. An interface customizer is a host language component (i.e. Java bean) that implements the system provided "InterfaceCustomizer" java interface. The procedural logic in the component is completely arbitrary and decided by the developer (in the table reader example, the interface customizer will contain logic for inspecting the table metadata and building the output port record element types accordingly). The resulting logic can be configurable since it is encapsulated in a host language component. The developer configures the interface customizer's properties using the declarative language. These properties can be configured by being set to particular values, or by delegating from interface properties of the map component.

If there is an interface customizer, the developer also sets some of the customizer properties or delegates map component interface properties to particular customizer properties. The implementation section is where the developer specifies which internal components the map component has, how their ports are linked, and whether the implementation has a customizer.

There are two flavors of components that the developer can use as internal components: map processes and map components. The map process is a scalar map: it contains an executor interface (i.e. executor ports) and an atomic, natively executable, implementation. The map process is a host language component (i.e. a Java Bean) that implements the system provided class interface MapProcess. Therefore the map process implementation is not made of internal components and links but of procedural logic expressed in the host language. It is important to note that the procedural logic inside a map process does not need to contain parallel logic whatsoever. The parallelism comes when all map processes are automatically executed in parallel by executor 14. All procedural transformation work done in map components ultimately resolve to work done in a map process (for instance, the work of uppercasing a dataflow queue of strings).

Map components will come from libraries provided with the engine, from third parties, and from libraries developed by the user. Such map components would reside in the Library 16 of FIG. 1.

When writing the implementation there may be cases when the developer cannot make all decisions regarding internal components and links statically. In this case, the developer puts in the source as much as she knows and then delegates the dynamic aspect to an implementation customizer. An implementation customizer is a host language component (i.e. java bean) class that implements the system provided ImplementationCustomizer java interface. Similar to the interface customizer component, the procedural logic is completely arbitrary and decided by the developer. The resulting logic can be configurable since it is encapsulated in a host language component. The developer configures the implementation customizer's properties using the declarative language. These properties can be configured by being set to particular values, or by delegating from interface or implementation properties of the map component.

FIG. 4 illustrates the general structure of a given map component source file 201. Note that several combinations are allowed and not all boxes in the structure are required. For instance, a map component source can be built with other map components referenced and linked internally with no customizers or map processes, etc. The system provided mapcomponentsource.xsd XML schema can be consulted to learn more about the valid combinations.

The next phase is the map component assembly (203 in FIG. 2A) to validate the structure of a map component source 201, protect its contents against unauthorized changes, and to protect the intellectual property included in the source. This is accomplished by using the map component assembler 203 (FIG. 5), a tool that validates and encrypts internal information of a given map component source document file.

Figure 5:
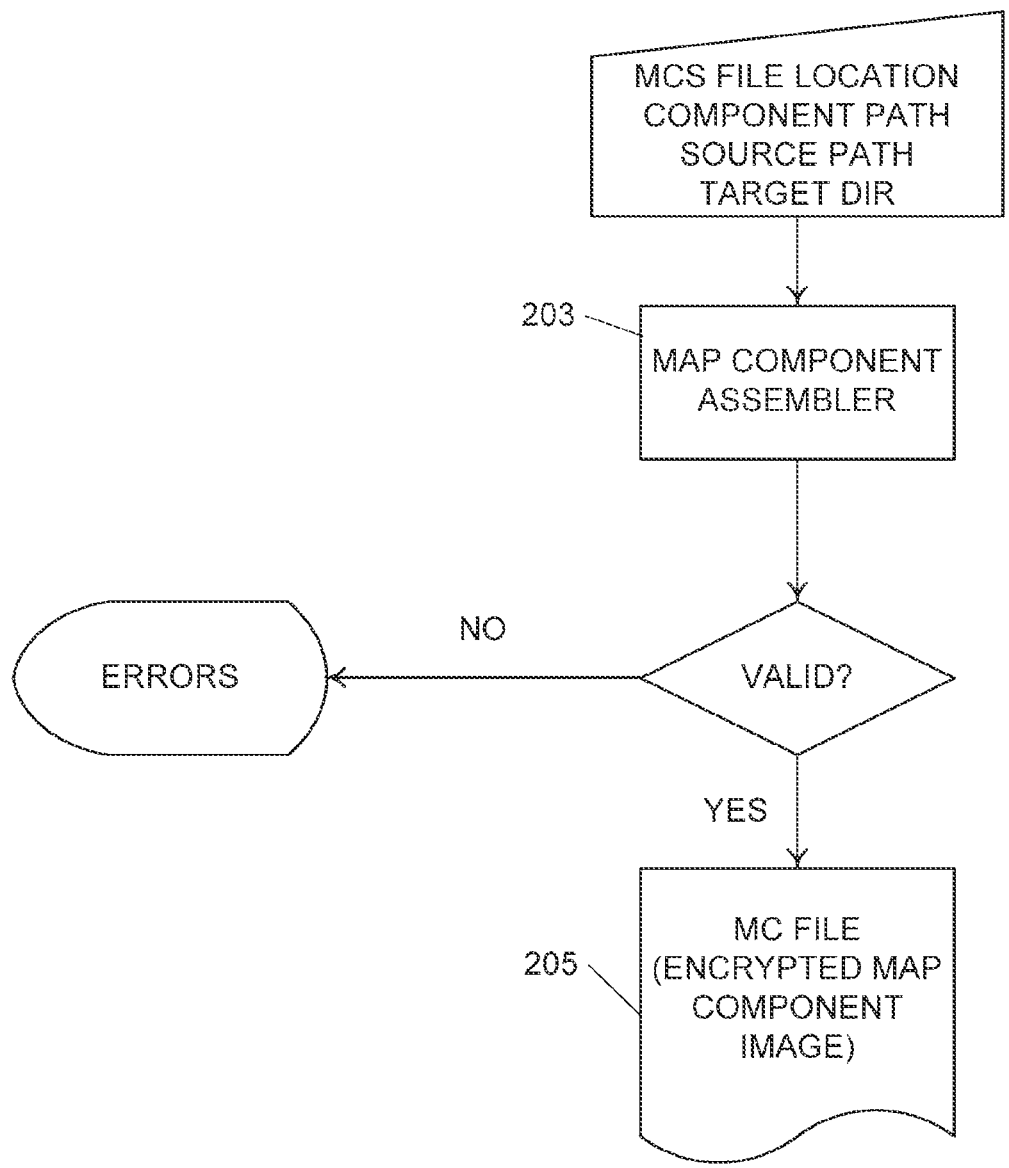
FIG. 5 is a flow diagram of the assembly process of a map component.

The assembly process is illustrated in more detail in FIG. 5. As can be seen, the assembly tool 203 takes four inputs: a map component source location, a component path, a source path, and a target directory. The location of the map component source indicates where the particular source to be assembled is located. The assembler uses this to find the file and read it.

The component path indicates the location of the re-usable component repositories (in Java this is a class path). The assembler 203 uses this to dynamically load and verify that internal components exist and are up to date. If an internal map component file is not up to date, then the assembler re-assembles it.

The source path is a host language expression to indicate the location of source repositories corresponding to internal map components. If a source is found then it is used for potential re-assembly of out of date map components.

The target directory is used as the root of the resulting map component file location. Map components use a hierarchical name space compatible with the Java language package notation for organization and loading of map component files.

Figure 6:
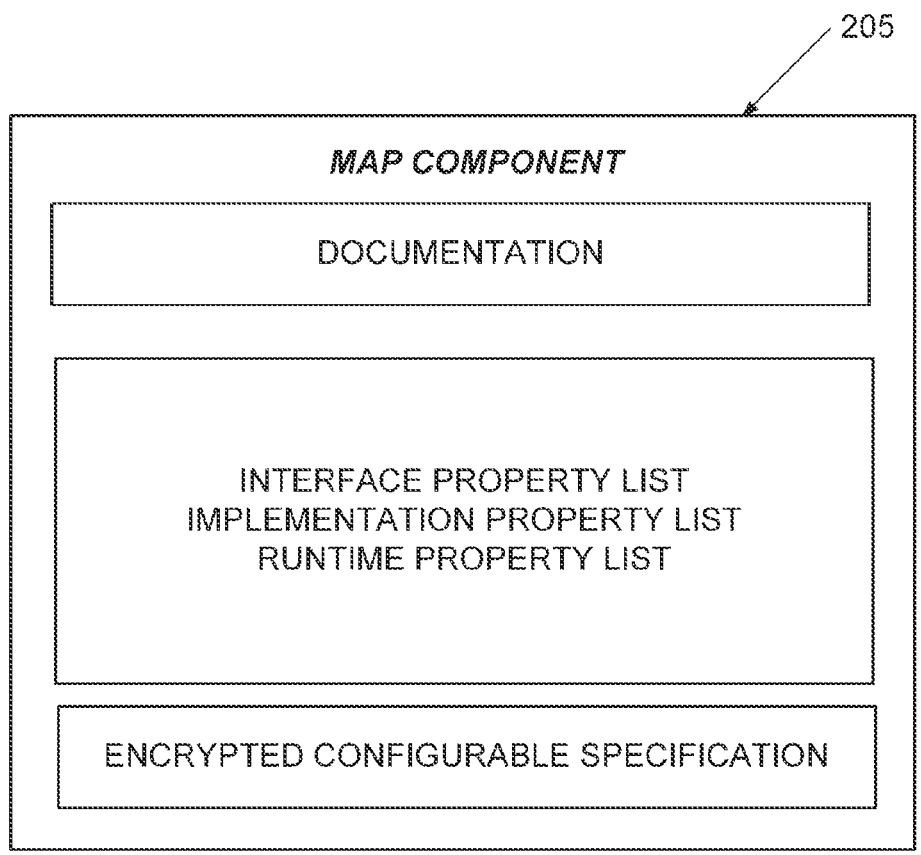
FIG. 6 is a block diagram of the structure of the extensible markup language ("XML") file resulting from FIG. 5.

If the input is valid, then the assembly process generates the MC file 205 which contains the information given in the source in a tamper proof, encrypted, way. FIG. 6 shows the structure of the resulting XML file.

Figure 7:
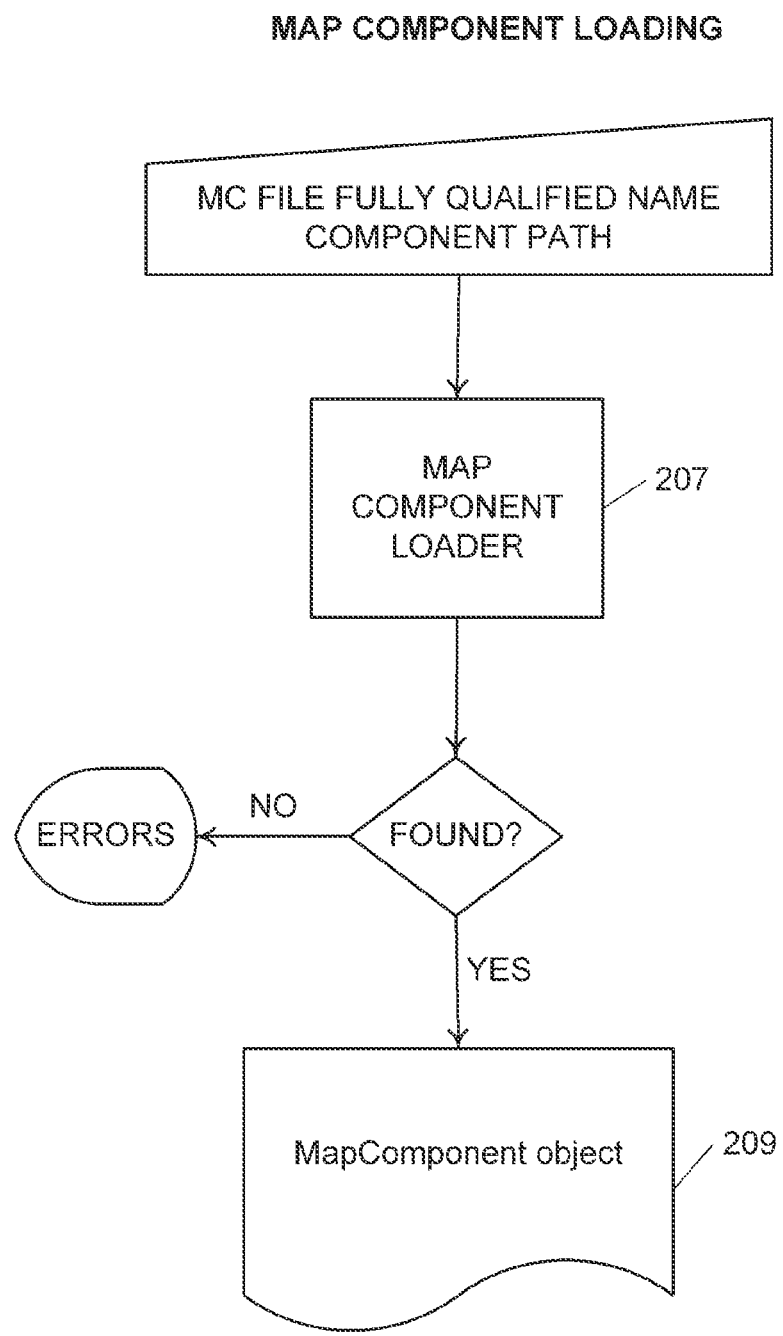
FIG. 7 is a flow chart of the map component loading process.

All of the design tools used for steps after map component assembly (FIG. 5) work with host language objects Therefore, before further manipulation, the map component must be loaded using the map component loader 207. FIG. 7 illustrates this process. The map component loader takes two arguments. The map component fully qualified name and the component path.

The map component source includes directives for naming the package of the component and the name of the component. The fully qualified name is built from the package and the name using the same syntax as Java fully qualified class names. The component path has the same meaning as the assembler's component path.

While the input and output of the two previous tools were files, the map component loader 207 input is a file but its output is an object: the map component object 209. Once loaded, the map component object 209 can be interrogated regarding its documentation and properties, but not its specification.

Figure 8:
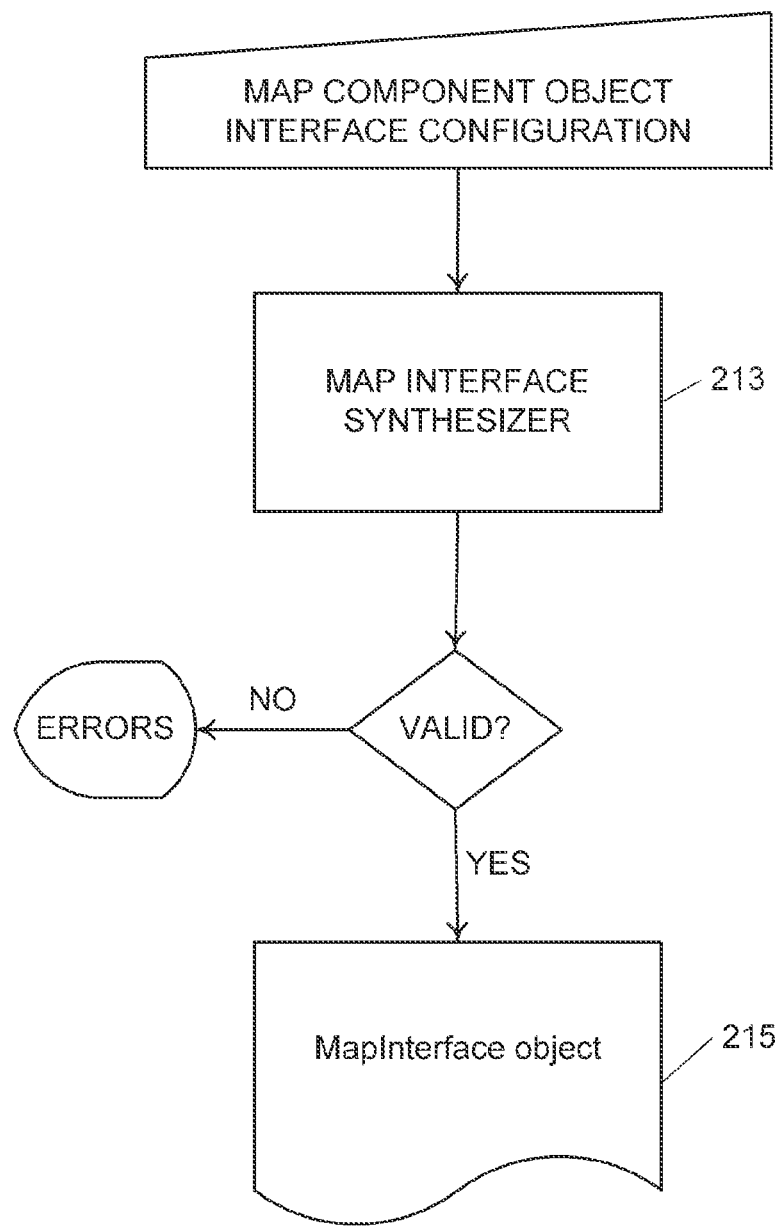
FIG. 8 is a flow diagram of the process for creating a map interface object.

The objective of the map interface synthesis step 213 of FIG. 8 (see also FIG. 2A) is to resolve a fully configurable map component object into a map interface object 215. A map interface object is a partial map whose ports have been resolved but whose implementation is still left to resolve.

The map interface synthesizer 213 takes two inputs: a map component object and an interface configuration. An interface configuration is a list of interface-property-name/interface-property-value pairs. The tool uses the configuration to bind the interface properties of the given map component object 209 and then generates the port list calling the internal interface customizer if one is defined. It should be understood that the map interface synthesizer 213 is an example of "dynamic logic" employed in the present invention. That is, map interface synthesizer 213 changes external port structure during compile and maybe be thought of as a way to customize the interface dynamically during compile.

Figure 9:
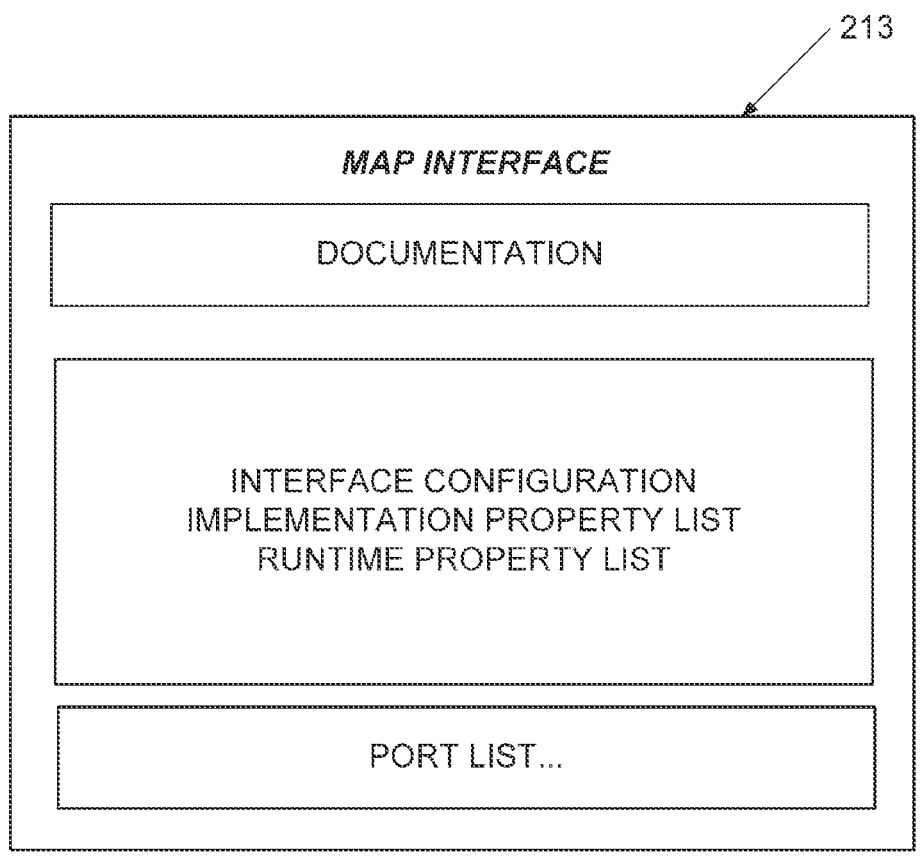
FIG. 9 is a block diagram showing the structure of a map interface object.

If everything goes well, client code using the map interface synthesizer 213 will then receive back a reference to a map interface object 215 implementing the system provided Mapinterface interface. Once client code has a reference, it can then interrogate it with respect to its documentation, interface configuration, implementation properties, runtime properties, and ports. It is still not possible to ask for the map's implementation. FIG. 9 illustrates the structure of a map interface object.

Figure 10:
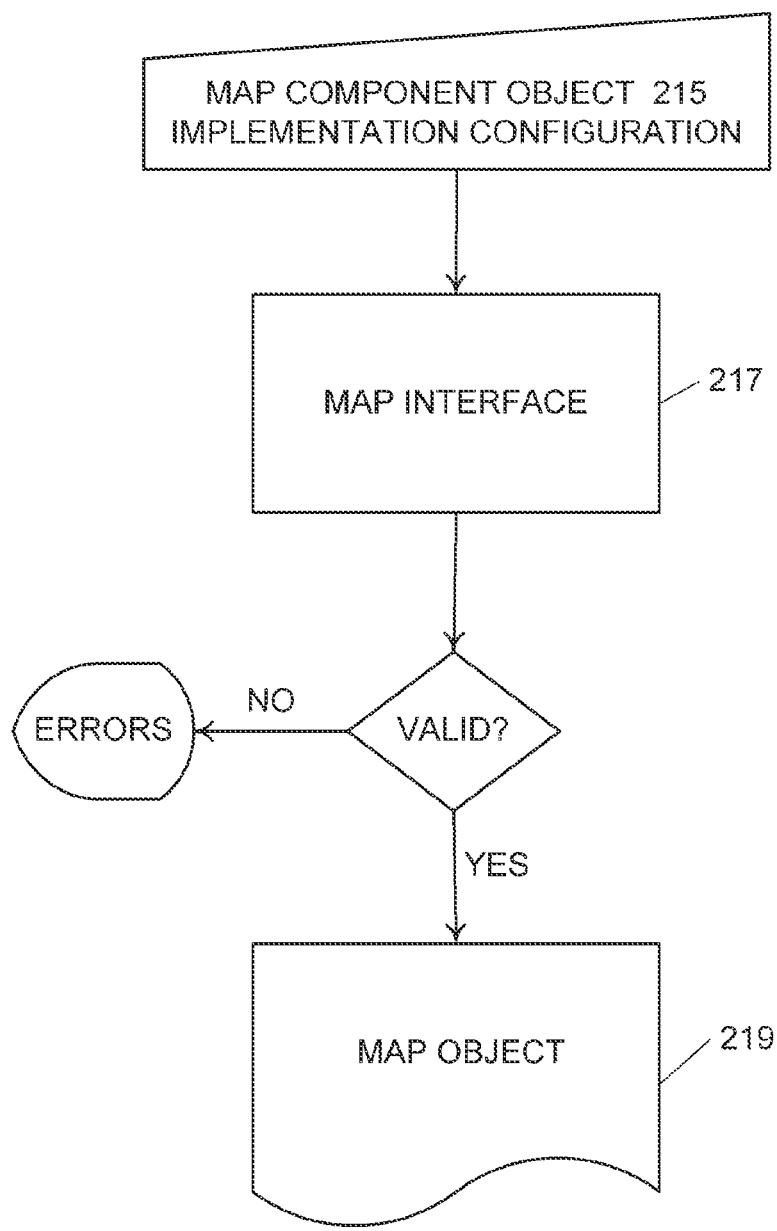
FIG. 10 is a flow chart of the map synthesizer.

The objective of the map synthesis step (217 in FIG. 2A) is to finally generate the particular map resulting from a map component and interface and implementation configurations. The tool to use is the Map synthesizer 217. FIG. 10 illustrates this step in more detail.

The map synthesizer 217 is a host language component that takes as input a map interface object, explained above, and an implementation configuration. If everything goes well, the tool will produce as output a Map object 219.

Figure 11:
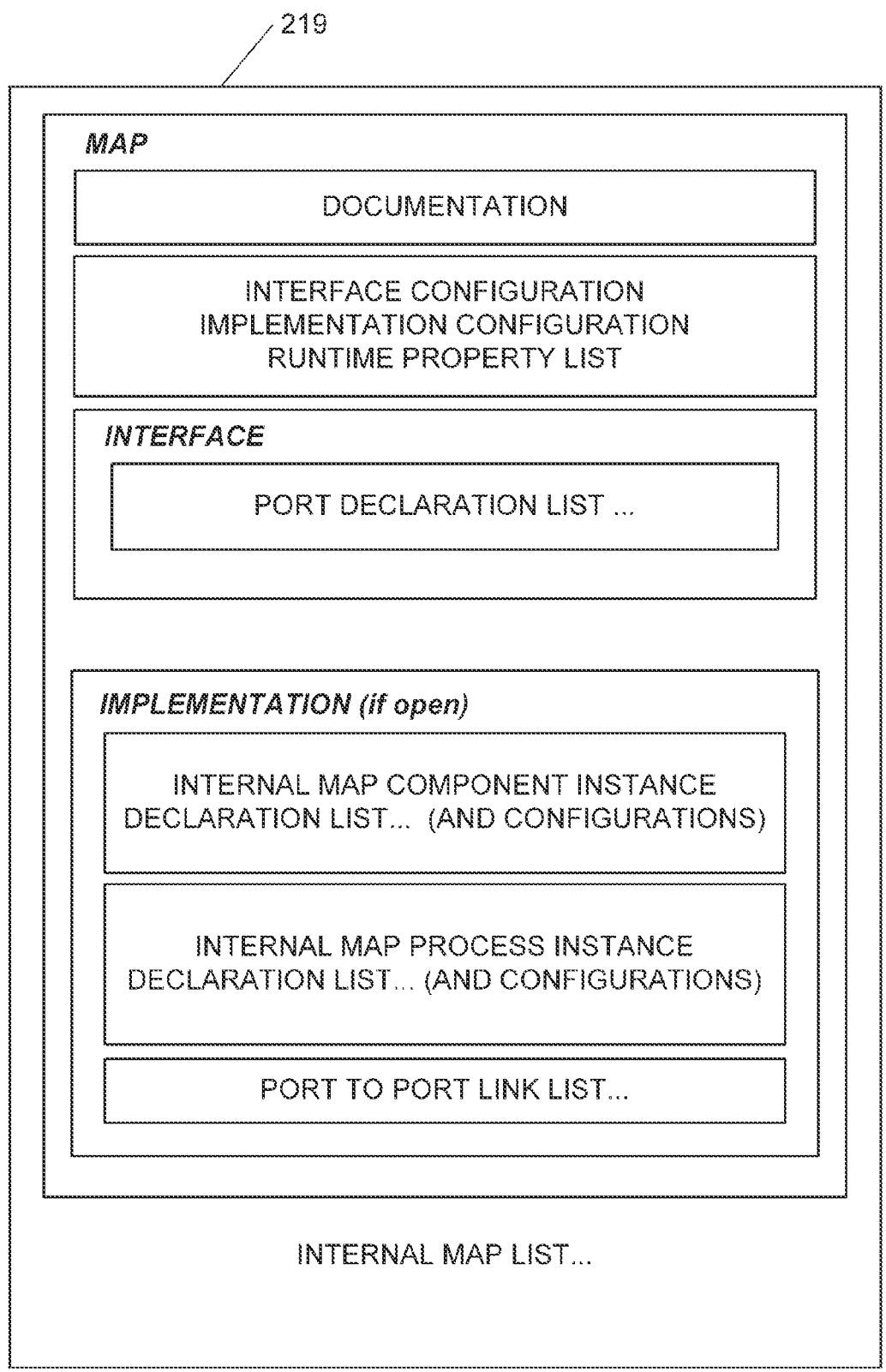
FIG. 11 is a block diagram illustrating the structure of a map object.

A map object 219 can finally be interrogated regarding its documentation, interface configuration, implementation configuration, runtime properties, ports, and implementation. Note that the implementation will be displayed only if the map component source developer indicated that the map component implementation can be displayed. If the map component and all internal map components are open, then the full hierarchical implementation will be visible. FIG. 11 illustrates the structure of a map object 219.

A map 219 that has no input and outputs is a dataflow application. If the map object 219 represents a dataflow application then the map synthesizer also produces the execution plan, an internal (i.e. private) data structure. The execution plan is a flat (i.e. non-hierarchical) data structure containing references only to the map processes included in the map as well as their links among executor ports of the map processes.

Figure 12:
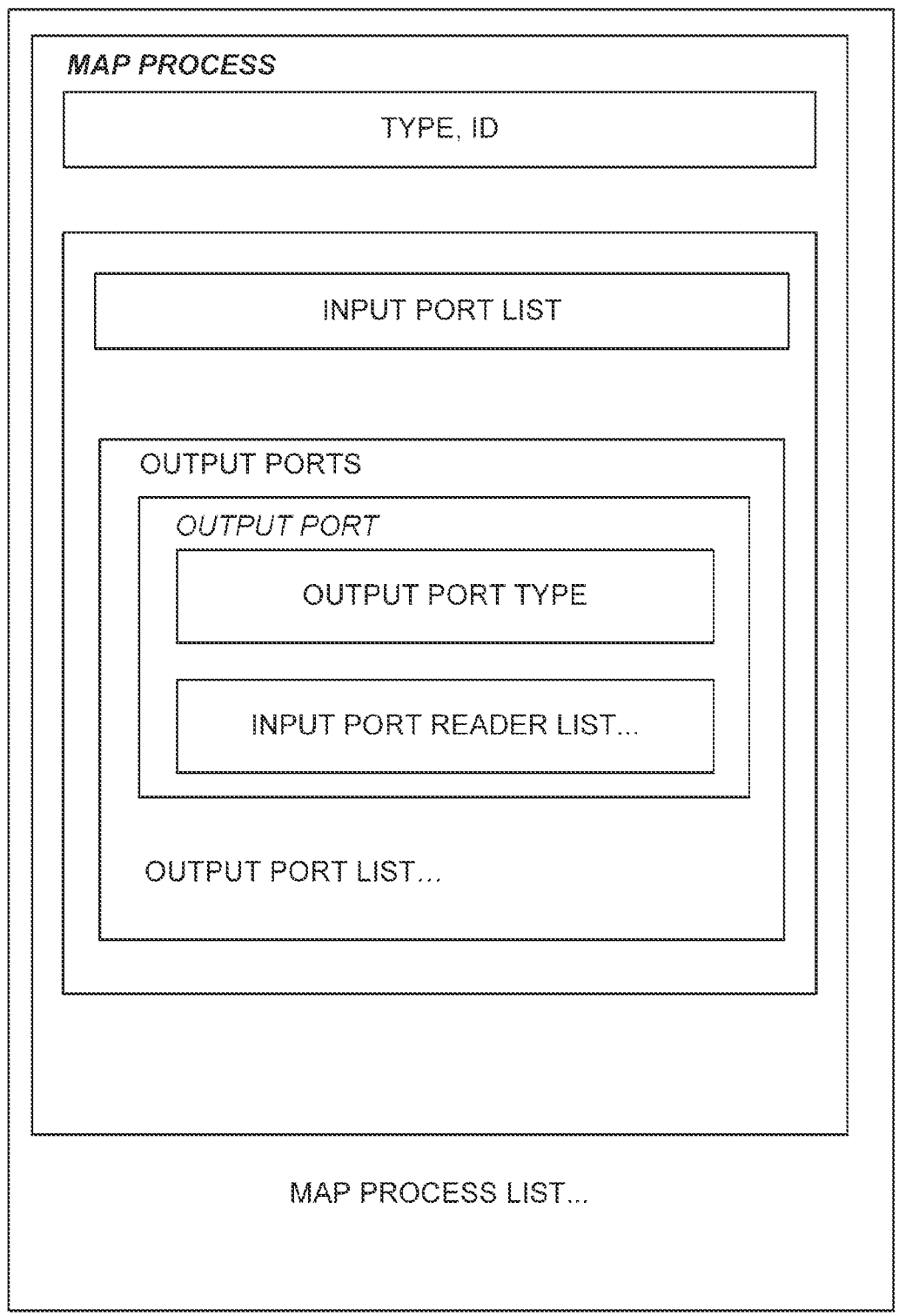
FIG. 12 is a block diagram showing the execution plan.

The execution plan synthesis process discards all structural information that is important for human re-use and understanding of maps but is not needed for execution. It also discards all customization logic and other structures only concerned with compile time validation. Execution plan generation can be seen as an optimization technique that helps execution performance by reducing footprint, removing indirection (i.e. MC ports) and reducing complication of design. FIG. 12 shows the structure of an execution plan. The executor plan is basically text that can be persisted or delivered for execution.

If a map 219 is not a dataflow application, then the map synthesizer can still be used as a development process aid since the developer may want to know the final structure of maps generated from a map component for testing or documentation purposes.

The map synthesizer tool 217 is a key component of the compiler 12. Full syntactic and semantic validation of the hierarchical map structure is done here as well as type synthesis, plan generation, and other optimizations. The resulting map object can then be queried about its internal structure (i.e. ports, internal components, and their links) as shown in FIG. 11.

As noted above, during creation of a map component a user may employ "dynamic logic" to construct an implementation or interface customizer. An interface customizer changes external port structure while an implementation customizer changes internal graph structure. Besides semantic validation and port type propagation (i.e., type synthesis), a key goal of the map synthesizer 217 is to customize the implementation and is made possible by three architectural features. First, there must be a distinction between graph creation and graph execution: "compile time" vs "runtime" (FIG. 2A vs FIG. 2B). Second, there must be composite components: components whose implementation is a graph of subcomponents. Third, components can embed logic to dynamically alter internal implementation. This logic when executed has access to synthesized type of input ports. The simultaneous use of these architectural features are not known in any current dataflow systems and their occurrence enable the important functionality of map synthesizer 217. The map synthesizer 217 can invoke an implementation customizer to change a composite component's implementation graph at compile time.

Importantly, the implementation customizer collaborates with the map synthesizer 217. The map synthesizer 217 provides the following information to the implementation customizer:

The static part of the implementation graph;
The values of design-time (i.e. compile-time) properties; and
The synthesized types of external ports.

Based on the information provided, the implementation customizer may:

Add map components and map processes to the implementation graph
Add links to the implementation graph.
Configure the properties of map components and map processes in the implementation graph.

In general, implementation customizer process allows a whole family of related dataflow graphs to be packaged as a single reusable component with a simple interface. The implementation customizer builds an appropriate implementation graph, based on the contextual information provided by the map synthesizer 217.

The implementation customizer can be used to achieve a variety of purposes.

1. To control the degree of parallelization. For example, FIGS. 17 and 19 respectively illustrate "split" and "join" operations where the number of CPU's (or threads) is a property.
2. To include or exclude the implementation of optional features such as the Gzip decompress function inclusion (or exclusion) in the flat file reader component operation illustrated in FIG. 16.
3. To route different fields to different subcomponents, depending on the field names given in a property. See the different linking of join keys and join data in the "join" operation depicted in FIG. 19 based on the key names property.
4. To select different implementations for different data types. One example is a generic data type converter component, with different implementations for DoubleToInt, FloatToString, StringToDate, etc. Another example is components for arithmetic operations: a multiplication component could have different implementations for different types of number (MultiplyLong, MultiplyDouble, MultiplyBigInteger . . . ).
5. To create dataflow templates that use components as property values. A simple example would be a generic data cleaning component that lets through the rows that pass a quality check but writes all other rows to a reject file. This generic filter could take a quality checking component as a property. Quality check components wouldn't have to know about filtering or the reject file. They could simply read in the rows and write out a boolean: pass or fail, for each row.

Figure 23:
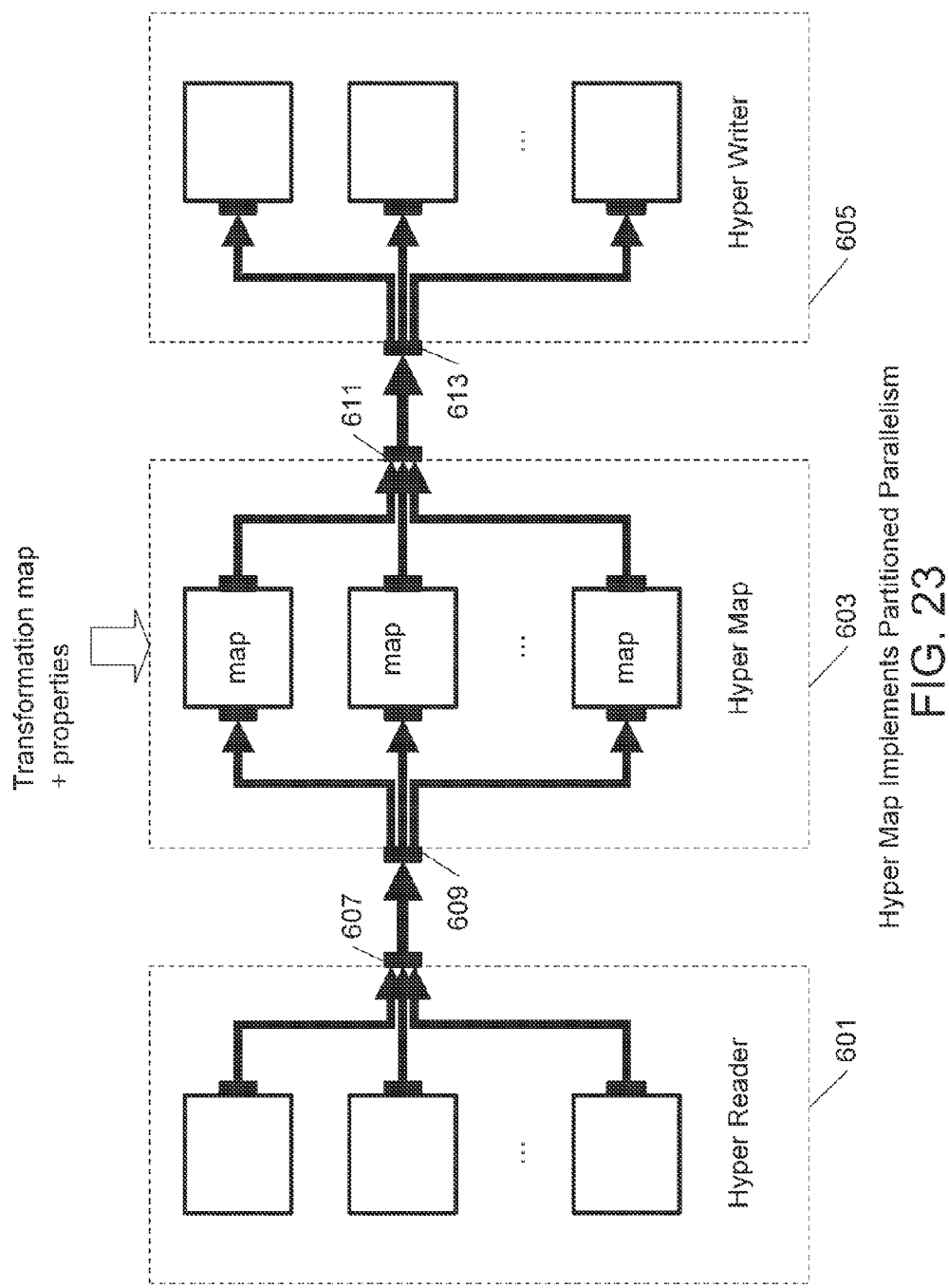
FIG. 23 is a block diagram showing a dataflow synthesis process applied to FIG. 22.

The hypermap component of FIG. 23 is easy to use because it takes easy to understand properties and from there the map synthesizer 217 builds its internals. But the internals shown in FIGS. 23 and 25 may be difficult to understand because it combines two uses of the map synthesizer 217 (Nos. 1 and 5 above). The Hypermap function operates as a dataflow template that captures the general pattern of using dynamic logic (#5 above) to control the degree of parallelization (#1 above). Both the degree of parallelization and the component to be parallelized are determined dynamically.

When a component reaches the map synthesis stage 217 of the lifecycle of FIG. 2A, the map synthesizer checks if the component has an implementation customizer. If it does, then the implementation customizer is run. Once that is done, the subcomponents in the implementation, and the way they are linked, is known. The map synthesizer then moves the subcomponents through some lifecycle stages: loading, map interface synthesis, and . . . recursive map synthesis. This recursive process builds the map object, a hierarchical structure of components nested inside other components.

Before recursive map synthesis on a subcomponent, the map synthesizer determines the types of the input ports of that subcomponent by looking at the sources linked to those input ports. This "type synthesis" step is necessary so that input port types will be available when the subcomponent's implementation customizer runs.

In summary, the map synthesis stage 217 consists of:
1) Running the implementation customizer, if any.
2) Loading the subcomponents.
3) Map interface synthesis of the subcomponents.
4) Map synthesis of the subcomponents, interleaved with semantic validation and type synthesis of the port-to-port links.

B. Preparation and Execution

To finish compile as shown in FIG. 2A, the map object 219 obtained by synthesizing a map using the process above encodes information useful for display purposes. If the map object 219 contains no ports then it is a dataflow application and therefore also contains an execution plan. In this case, the map object 219 can be executed.

Figure 13:
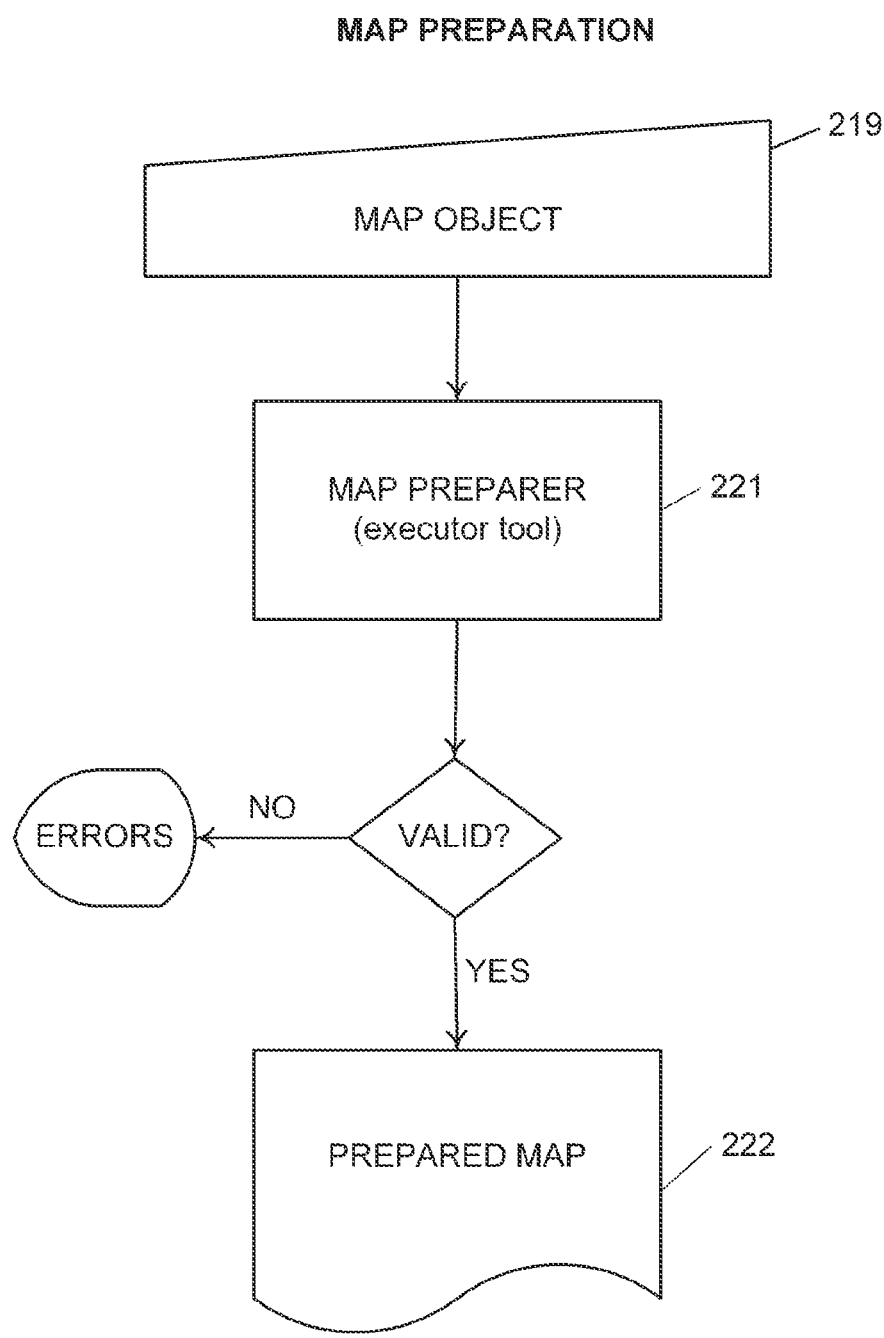
FIG. 13 is a flow chart illustrating the load map processes and set up internal data structures.

As shown in FIG. 13, a prepared map 222 is generated from the map preparer tool 221, which takes as input a fully synthesized map object 219. A prepared map 222 is the executable portion of the dataflow graph with all composite component structures stripped away, leaving only the map process elements and their subsequent dataflow links for parallel execution. The map preparer 221 uses the map object's plan information to load map processes and sets up internal data structures. A prepared map can be queried regarding its runtime properties.

Figure 14:
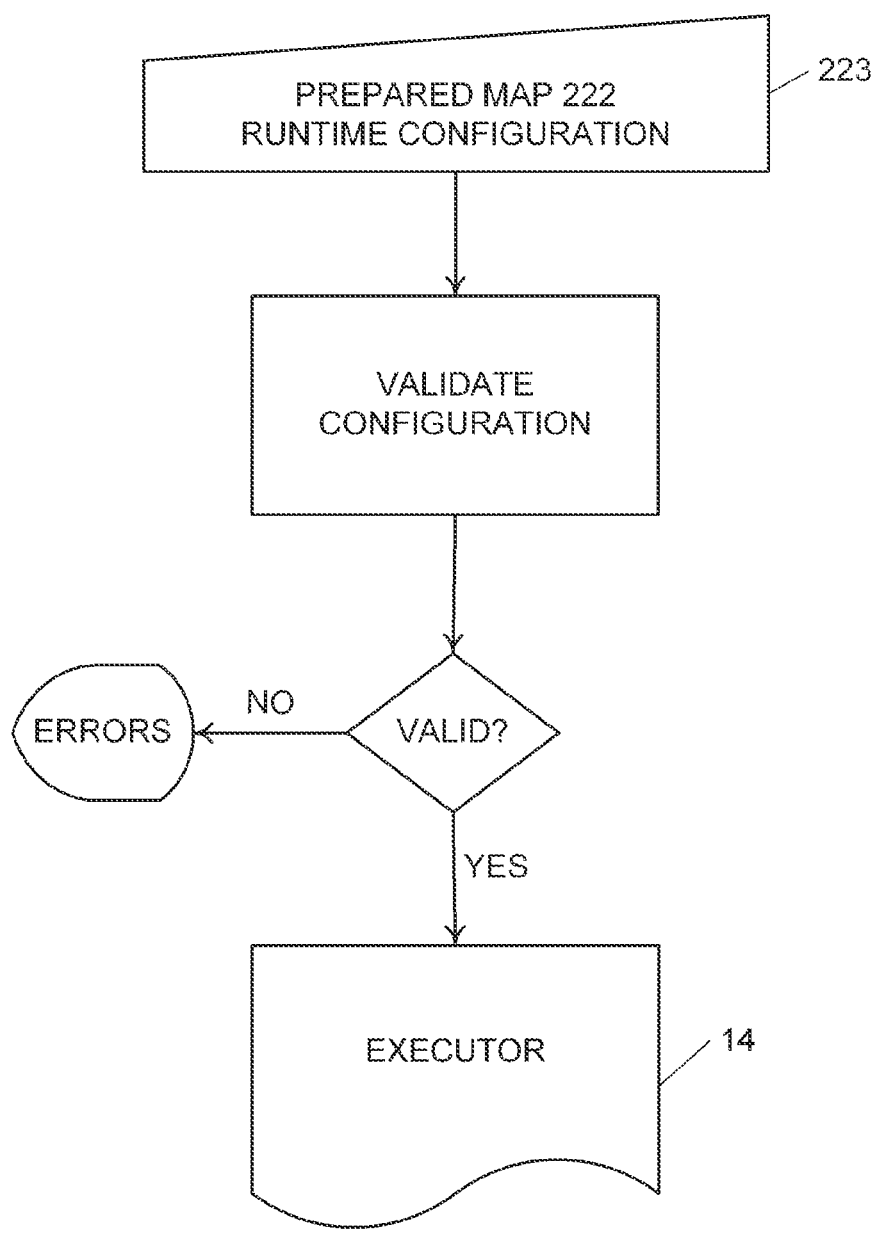
FIG. 14 is a flow diagram depicting the routine for executing a prepared map object.

The executor 14 takes a prepared map along with runtime properties, 223 in FIG. 14, and generates a "task" that can be executed only once. A configured prepared map 223 can be executed multiple times by generating a new task for each execution. A task is a collection of threads with a thread allocated to each map process instance thus allowing all map processes to execute in parallel. The executor thus takes a PreparedMap object 223 along with a runtime configuration (i.e. a list of runtime-property-name/runtime-property-value pairs), validates it, and then executes it if correct.

Note that this last step is similar to the way relational database queries are executed: first they are prepared (i.e. compiled), then parameters are set, then the query is sent to the executor for execution. If a sub-sequent execution is needed, there is no need to pay the price for recompilation: just reset parameters, and resend the same prepared query. Thus, this is another performance optimization. FIG. 14 illustrates this step. Note that the executor 14 has also an internal structure and a lifecycle.

Because a task is a collection of threads and map process instances with a thread allocated to each map process, it is also a single point of failure. That is, if any thread within the task fails, the entire collection of threads will be terminated abnormally with exception/stack trace information pertaining to each thread/map process.

When a task is run, each map process instance within the task is executed in parallel in a collection of threads. During execution the user defined logic within the map processes read data tokens from input ports and/or push data tokens onto output ports. A map process typically reads data from input ports until an end-of-data operation is encountered for all input ports. Likewise a map process typically performs an end-of-data operation on all output ports as the last operation following all data tokens pushed. After instantiating the map processes and setting any runtime properties, the executor then initializes and links the publicly declared map process ports to complete the executable task.

Figure 30:
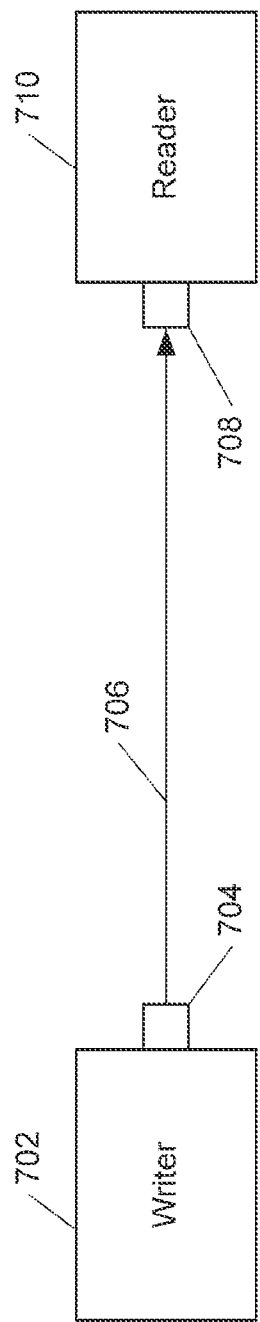
FIG. 30 is a diagram of a generic process network.

Input ports block/wait when data tokens are not yet available from the corresponding output port comprising the dataflow link. Output ports block/wait when data token output production exceeds system defined queue limits to allow the corresponding input ports comprising the dataflow links to catch up. This may be visualized in the process network of FIG. 30. In FIG. 30, a queue 706 connects two processes, 702 and 710, where 702 writes tokens to queue 706 and 710 reads tokens from queue 706. That is, FIG. 30 shows a firstin, first-out communications channel where data tokens send along the queue 706 are stored until the destination process 710 consumes the data tokens.

In general, the system makes use of the port type synthesis during compile to optimize execution. The type synthesis phase in map component synthesis (217 in FIG. 2A) predetermined the exact type of each dataflow link. This allows the executor 14 to choose specific, type optimized, port implementations. The executor 14 has specific port implementations for all primitive, standard database data types. These ports are individually optimized to move specific types of data.

Due to type synthesis, generic ports at design time become specific ports before execution. The executor 14 queries the synthesized type of each link within the prepared map 222 (FIG. 2B and FIG. 14) and initializes declared input/output ports of each map process with appropriately typed input/output port pair implementations.

Referring to the generic process network of FIG. 30, the synchronization and transportation overhead of passing each data token individually from output port 704 to input port 708 would usually be excessive. The specific port type implementations utilized by the executor 14 mitigate this overhead by passing tokens to a local unsynchronized token buffer (a "batch") and thereafter passing these batches to the synchronized communication queue instead. Regulating the size of the token batch regulates the length of time a map process may execute free of synchronization thus minimizing thread contention.

The end result is a map process in accordance with the present invention may push many batched data tokens on an output port 704 before the corresponding input port 708 comprising the link 706 will wake up. The input port 708 will subsequently produce tokens without blocking for as many tokens as there are in a token batch. This results in map processes that wait for a substantial amount of data to build up as input before they wake up to execute and thus they also run uninterrupted for longer periods of time, making optimal use of multithreading systems.

Null value is typically considered two-state: either unknown or valid. In the system 10 of the present invention, all port implementations support the concept of multi-state null value tokens. That is, the input/output ports support three state logical operations with null values. Indeed the system 10 has extended this concept to multi-state, user defined, null values including a system defined error null.

Error null allows a component to capture transformation exception state when local context is insufficient to adequately report the problem, and push it through a dataflow link as a type of null value. A downstream map process in the dataflow graph can then deal with and report the exception when context is fully known.

All states of null value default to a minimum state null if transported to a domain that supports only minimal state null value logic like a relational database. All ports provide a default data value if null value testing is completely ignored or transported to a domain that does not support null value.

As seen during the design and compile phase (see also the examples below, FIG. 20), a composite port is a collection of ports and is the primary port type for passing composite or record data. Each column/field in the record is transported via its own sub port. Sub ports can be advanced/iterated independently from the other sub ports within a composite port. Conversely, advancing/iterating a composite port will advance/iterate all sub ports in tandem.

Figure 24:
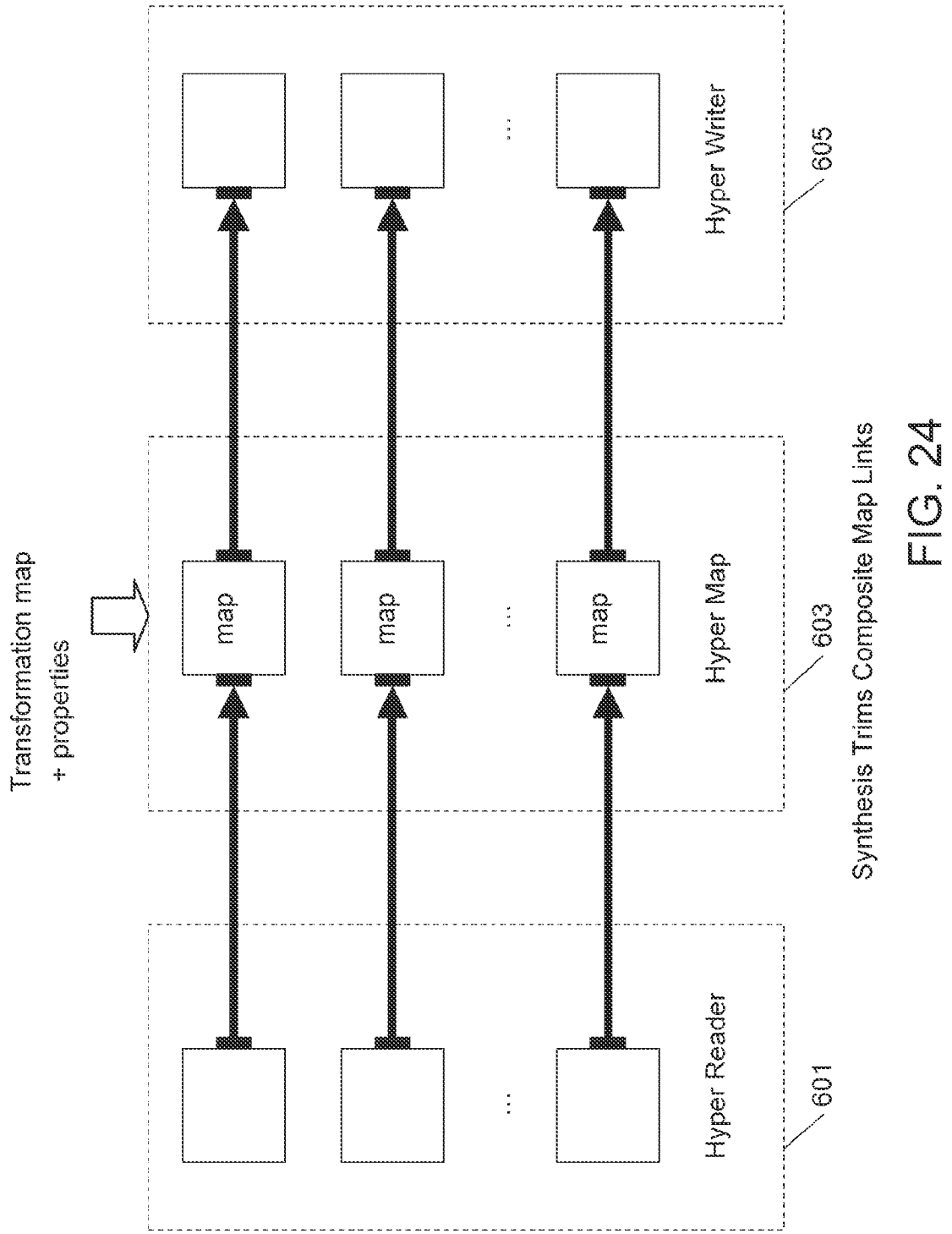
FIG. 24 is a block diagram illustrating the elimination of design time map links from FIG. 23.

Composite ports that are associated with composite components are trimmed along with the composite components during generation of the prepared map (See e.g. FIG. 24). Only the sub ports that ultimately link map processes remain, allowing for maximum parallel throughput of sub links. Composite ports that are associated with map processes are not trimmed but are populated with sub ports of specific type as predetermined by the type synthesis phase in map component compilation.

Map process instances within a task execute via a set of methods invoked by the map process thread. A map process has 3 distinct user defined execution stages and subsequent method calls. A map process start( ) method is called during startup to allow for user defined initialization. A run( ) method is invoked to execute a map process in parallel, analyzing input port tokens and/or producing output port tokens. A map process end( ) method is called after the completion of all map processes in the task to allow for user defined shut down logic.

start( ) Method

The start( ) method of each map process instance is called to allow user defined startup logic to run before dataflow execution. All map process start( ) method invocations will complete before any map process run( ) methods are invoked.

run( ) Method

This method is where the user embeds logic to process data tokens from input ports and/or push data tokens onto output ports. The run( ) method is called by each map process thread for each map process instance. The run( ) method passes a task context object as a parameter to allow the map process to interact with the task run-time state.

An interesting functionality of the system 10 of the present invention is the capability to execute subtasks within a map process. One task interaction feature provided by the task context object is the ability to invoke the compiler 12/executor 14 within a map process to create additional tasks as subtasks. Once a task has been added as a subtask it becomes part of the parent task's unit of failure such that if a subtask fails then the entire parent task is shut down and vice versa.

Invoking another task as a sub task within a map process is a way for dataflow applications to dynamically generate sub graphs depending of the content of data. An example of this is a generic sort component which might dynamically invoke multiple, independent merge sort sub graphs with the number of merge sorts dependent on the amount of data being sorted.

end( ) Method

The end( ) method of each map process instance is called only after all map process run( ) method invocations have completed. This method is where the user embeds logic to clean up after parallel dataflow execution is complete.

As can be appreciated from the generic process network of FIG. 30 and the above description, some method of deadlock detection and correction is desirable. The dispatching of map process threads is completely driven by the availability of data in the case of input ports 708, and the availability of queue resources in the case of output ports 704. A certain class of dataflow patterns that "split" and then "merge" a graph can deadlock without deadlock management for detection and correction.

A port 708 will block when the next token batch is unavailable, or the queue limit has been reached in the case of an output port 704. Before a port blocks a map process thread, it first performs deadlock detection/correction analysis. This begins by first adding the soon to be blocked thread to a wait graph by recording state in the thread indicating the other thread this thread is about to wait on. State is also recorded in the thread as to whether this map process is waiting as a producer in an output port or a consumer in an input port (702 and 710 respectively in FIG. 30). This is the beginning/continuation of a wait graph that is then analyzed.

The wait graph is then traversed starting with the node representing the thread the soon to be blocked thread is about to wait on. If that thread is blocked then the graph traversal continues with the next node representing the thread it waits on and so on. If the wait graph traversal encounters a thread that is not blocked then a deadlock does not exist and the current thread is allowed to block.

If a circular wait graph is detected then additional analysis is performed to correct the deadlock. A thread that waits as a producer (writer 702 in FIG. 30) in an output port is chosen from the circular wait graph and notified to exceed its queue limit. This chosen thread is allowed to exceed a queue limit on an output port (704 in FIG. 30) in order to continue processing and break the deadlock.

This process detects and corrects deadlocks as they occur by temporarily allowing queues to grow. Production rates of tokens from output ports is completely arbitrary due to the fact that it is driven by user defined logic. This process is similar to the process described by T. Parks in *Implementation of Process Networks in Java*, supra. However, this could potentially allow queues to grow beyond system memory resources. Before this occurs the system 10 performs additional analysis.

One solution to deadlock queue growth is allocating disk storage resources and allowing the queue to grow temporarily in disk memory. Before this happens, however, the other, non-expanding queues involved in the wait graph are analyzed for possible token batch reduction. The algorithm for token batch reduction can be chosen to optimize convergence of the deadlock correction, i.e. the algorithm can be chosen to minimally or maximally reduce the token batch size depending on the nature of the problem.

Token batching is essential to dataflow queue performance; however, it is counterproductive when queues expand beyond memory resources and must expand to disk. By reducing token batches in the non-expanding queues involved in the wait graph while at the same time allowing the expanding queue to continue results in a balanced optimization for both low and high memory environments.

III. Examples

The following examples show the flexibility and power of the data management system of the present invention. The diagrams indicate port type synthesis/propagation and the effect of properties on internal sub-map generation in dynamic composite maps. Thin solid arrows denote links between scalar ports. Thick solid arrows, indicating the grouping of multiple sub-port links, denote links between composite ports. Open block arrows denote design-time/run-time properties that can be set by the map user to affect behavior. A dashed open block arrow is an implicit property that the map itself can query at design time without explicit user intervention. A map denoted by a dashed outline indicates a composite map that can be drilled into to further expose sub-map dataflow graphs.

A. Flat File Transfer

Figure 15:
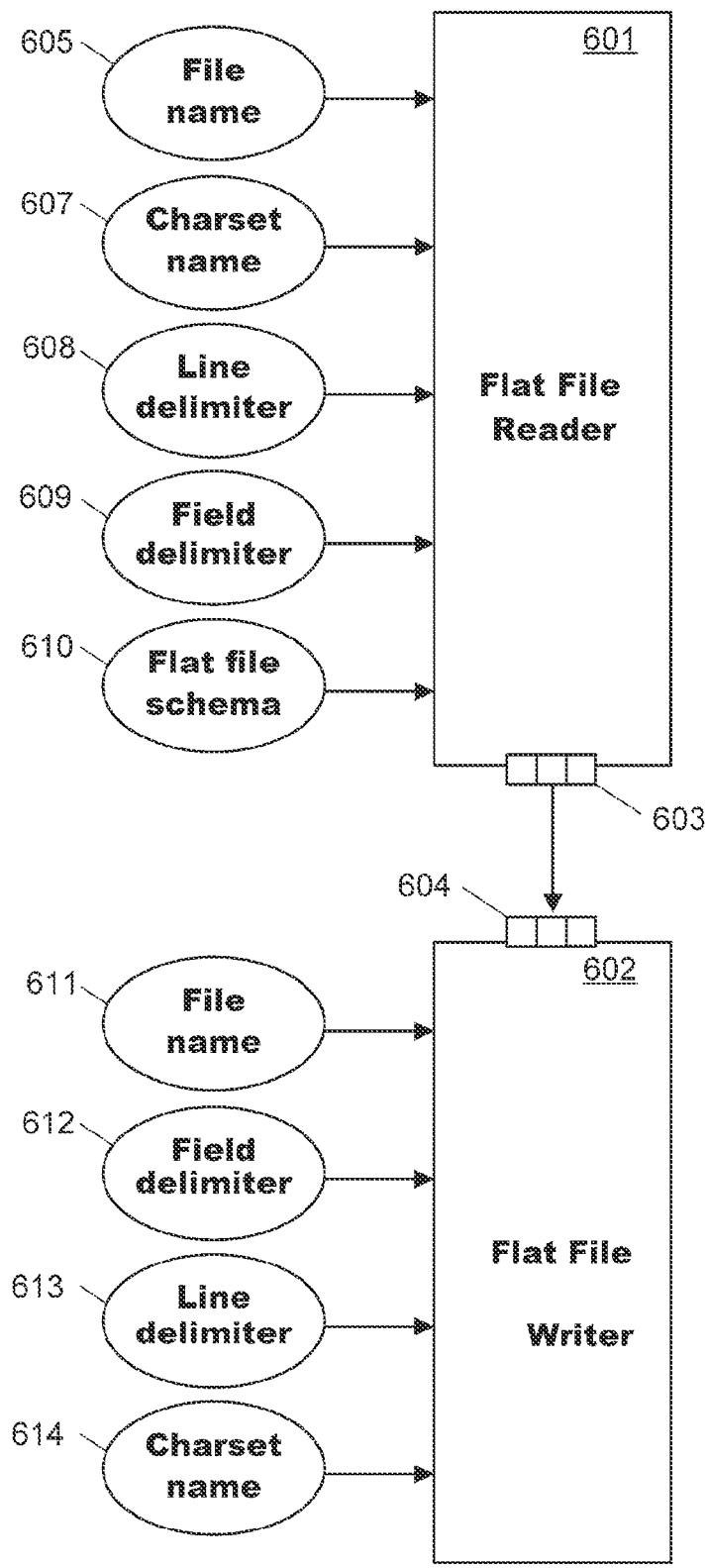
FIG. 15 is a component diagram of an example of an application employing two maps.
Figure 16:
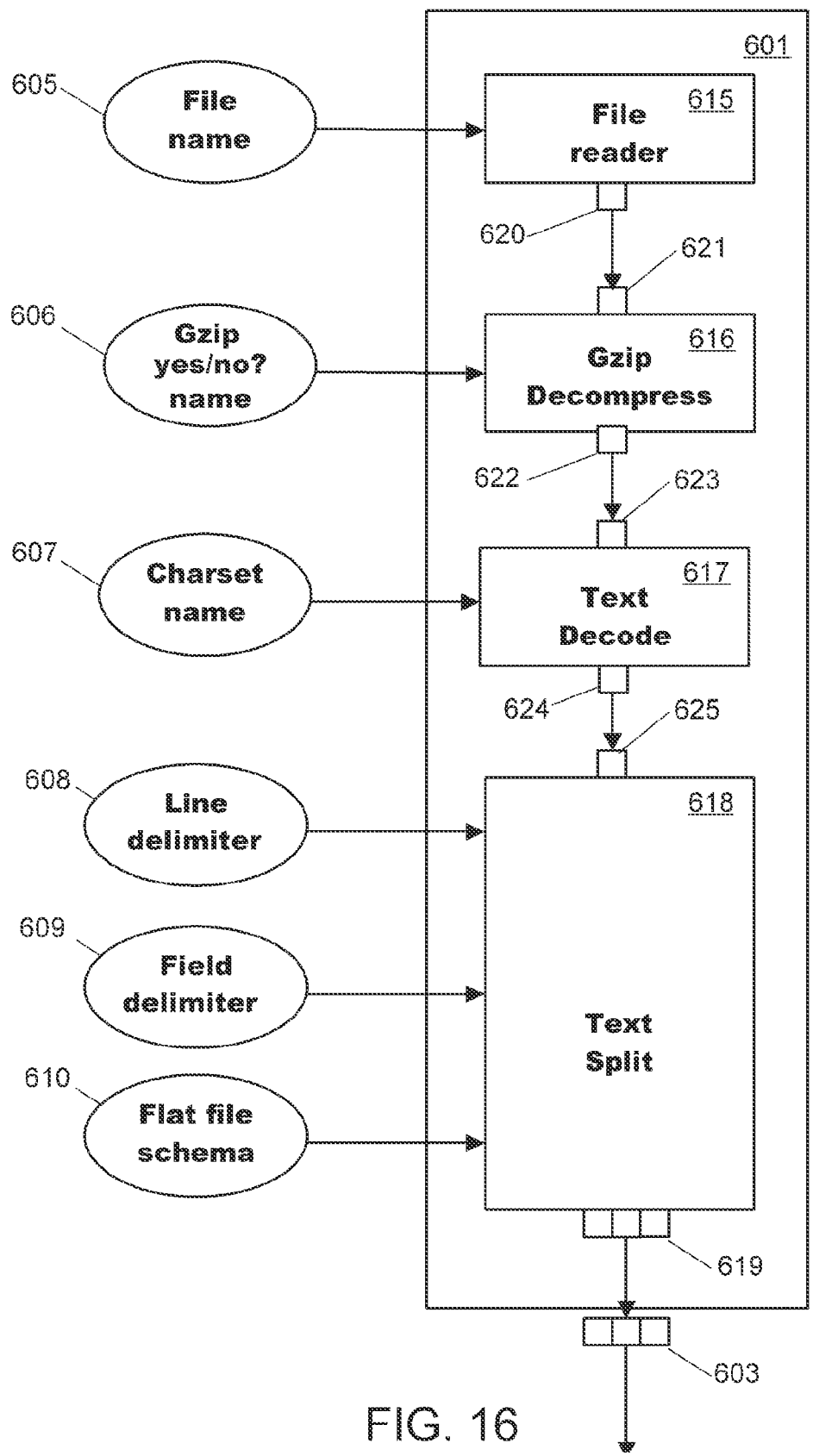
FIG. 16 is the internal dataflow graph for the Flat File Reader map of FIG. 15.
Figure 17:
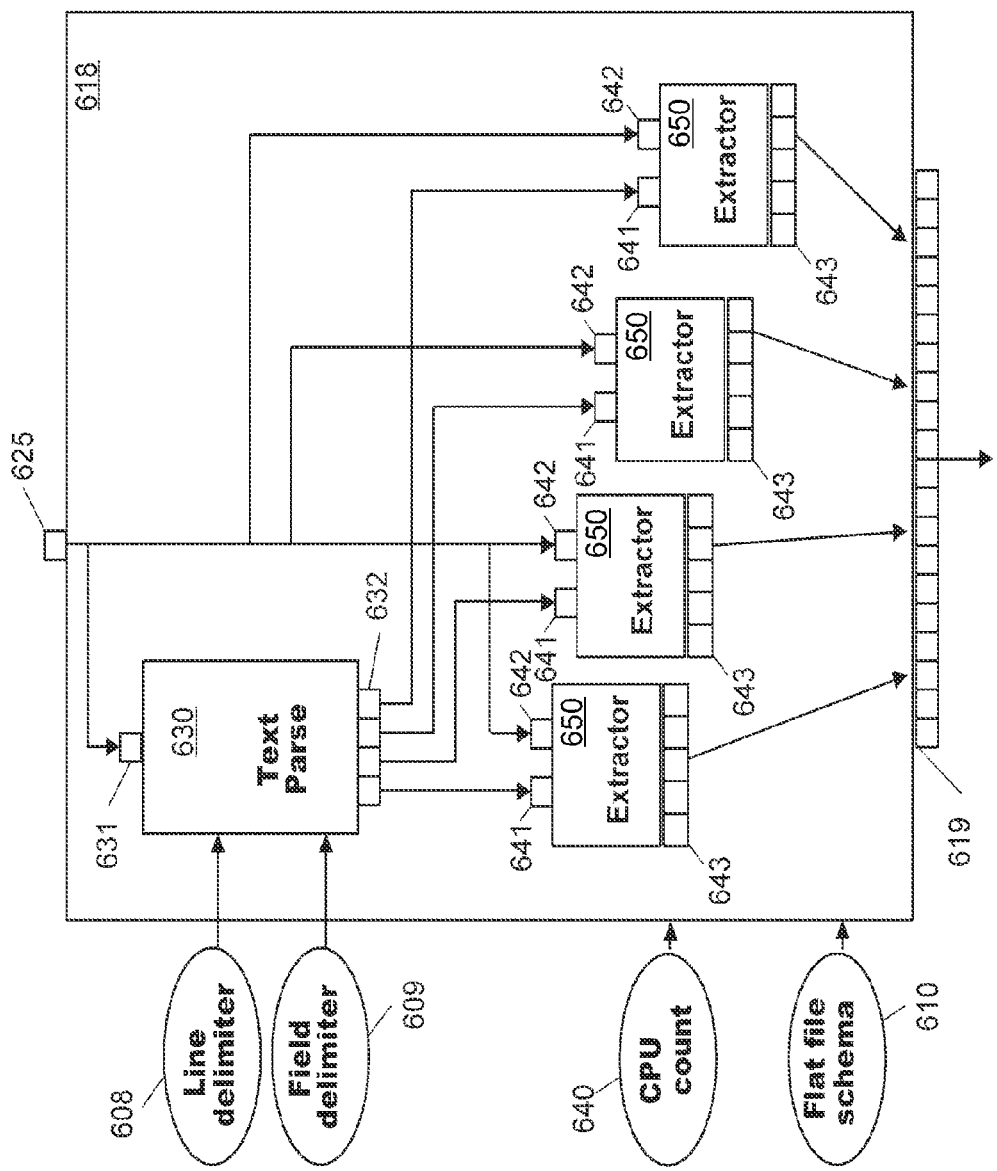
FIG. 17 is a diagram illustrating the internal dataflow graph of the Text Split map of FIG. 16.

The example of FIGS. 15-17 illustrates how applications can be developed by simply dragging/dropping/linking pre-existing map components. The application simply reads the fields from one flat file and writes the contents to another flat file, possibly with different line/field delimiters and/or encoded into a different Unicode character set.

FIG. 15 illustrates an application employing two maps. The output port of flat file reader is linked to the input port of flat file writer. The appropriate properties are set by the user at design time to indicate field/line delimiters, Unicode character set for encoding/decoding, file names, and input flat file schema (since flat files, unlike databases, do not have embedded schema definition).

In more detail, FIG. 15 shows a high-level map of an application which reads data from a single flat file and writes that data to another flat file in a different format (i.e. FIG. 15 does not depict a simple binary copy utility). Flat file reader 601 uses design-time parameter settings for file name 605, character set identification 607 (for example, a Unicode character set specifier), line delimiter 608, field delimiter 609, and a specification for the flat file schema 610. The inclusion of schema 610 is advantageous since a flat file may not carry within itself metadata identifying the significance of the data, as would a database. The output of flat file reader 601 appears on composite port 603 and is accepted as input by flat file writer 602 on its composite input port 604. Flat file writer 602 uses design-time parameter settings for file name 611, field delimiter 612, line delimiter 613, and character set identifier 614. In general, these parameter settings will have different values for reader 601 and writer 602. It is noted that although the data output types of composite port 603 of file reader 601 cannot be derived from the map at this level, it is clear that the composite input port 604 of flat file writer 602 must be synthesized to match the data types appearing on port 603.

The dataflow design tools of the data management system verify correct composition by analyzing the dataflow links for each linked port/sub-port. In the example of FIG. 15 the only link is a generic composite link so no type constraints exist and the input port type of flat file writer is synthesized to match the schema of the output port of flat file reader. This application is simple to create and use because the composite maps Flat File Reader and Flat File Writer hide implementation complexity within each sub-map.

FIG. 16 shows, in more detail, the map of flat file reader 601 of FIG. 15. As shown in FIG. 16, flat file reader 601 comprises raw file reader 615, which accepts parameter setting 605 specifying the file name. File reader 615 generates a stream of byte buffers which appears at port 620 and is accepted as input to gzip decompression function 616. Gzip decompression is optional, since it will not be needed unless the file has been compressed. Consequently, the selection to use gzip decompression function 616 may, in some embodiments, be made at design time by employing decompression selection parameter 606.

The output from optional decompression function 616 is a stream of byte buffers which appears at data port 622. This byte stream is accepted at input port 623 of text decoder 617. The parameter setting identifying the character set of the input file is determined by design-time parameter setting 607, which may be, for example, a Unicode character set identifier. Text decoder 617 converts the byte values of its input byte stream into a character stream, which appears at output port 624. This character stream is accepted at port 625 as input to text splitter 618. Text splitter 618 employs design-time parameters line delimiter 608, field delimiter 609, and flat file schema 610. These settings allow the character stream input at port 625 to be split into lines and fields to separate the characters into meaningful entities identified by the schema parameter 610. Text splitter 618 is a composite map, whose internals are not revealed at this level of the design. The output from text splitter 618 appears on its composite output port 619 and is transferred to composite output port 603 of flat file reader 601.

In general, the data type of output port 620 of file reader 615 is a stream of byte buffers. Thus, input port 621 of gzip decompressor 616 is constrained to be a byte buffer compatible data type according to dataflow linking rules. The output of gzip decompressor 616 is a stream of byte buffers as well, thus the input port 623 of text decoder 617 is also constrained to be a byte buffer compatible data type. The count of sub-ports comprising composite output port 619 and the data types which are handled by those sub-ports cannot be determined at this level of the map hierarchy, but it is clear that output port 603 must match the constraints which will be imposed by port 619.

Viewed another way, FIG. 16 details the internal dataflow graph of the flat file reader map of FIG. 15. The "file name" property is delegated to sub-map file reader, which reads the raw bytes from the source flat file. File reader's output is via a ByteBuffer output port so it can only be linked with ByteBuffer input ports or a compatible generic input port capable of synthesizing into a ByteBuffer port, according to dataflow linking rules.

The "Gzip" property of FIG. 16 is utilized by the Flat File Reader map at design time to dynamically include/exclude the Gzip Decompress sub-map, depending on whether the user wants to read a Gzip compressed source flat file. In FIG. 15 of this example, this property was not specified so the Flat File Reader map would not include this sub-map and subsequently link sub-map File Reader's output directly to the input port of sub-map Text Decode. The "character set name" property is delegated to the Text Decode sub-map. It takes ByteBuffers via its input port and produces decoded Unicode strings via its string output port.

The "line delimiter," "field delimiter," and "flat file schema" properties are delegated to the text split sub-map. It takes strings via its input port and produces the flat file's fields via a composite output port. Note that sub-map text split is itself a composite map, indicating further graph complexity.

FIG. 17 shows the next level of the design composition (i.e., the internals of text splitter 618). These internals are synthesized using the specifications of the flat file schema parameter 610 and the number of CPUs available at runtime provided by the executing system as CPU count 640. By deferring the synthesis of the text splitter until the runtime environment is known, the optimal dataflow sub-graph for text splitter 618 may be synthesized. In the example depicted in FIG. 17, the available CPU count is four. The character stream input at port 625 passes to input port 631 of text parser 630 and also to input ports 642 of the four extractors 640. Text parser 630 uses line delimiter 608 and field delimiter 609 parameters to analyze the input character stream and, thus, generates streams of offsets and lengths indicating the position of fields within the strings. This offset and length data appear on composite output port 632 of text parser 630 and are passed individually to ports 641 of the four extractors 650. By using the offsets and lengths, each processor selects its own data from the character stream, thus dividing the processing effort over the CPUs. Data streams from each extractor 650 appear on composite output ports 643. The specification of ports 643 can now be returned to the next higher level of the hierarchical map design to enable the synthesis of ports which depended on port 643.

Data streams available at composite port 643 may be heterogeneous after interpretation of the input character stream. For instance, character streams, such as names or addresses, would remain as character streams, but numerical data may be converted to native data types such as integers or floating-point representations, and dates or times may be converted to encoded forms. The design time synthesis process that occurs during map linking allows each map to further synthesize internal dataflow graphs once all the map's input ports have been synthesized. This process is recursive until all dataflow graphs in all maps have been synthesized.

The "flat file schema" property in FIG. 17 is utilized by the text split map to synthesize its internal dataflow graph, ultimately composed of the sub-maps necessary to transform text into data of specific types, and subsequently its output port type. The text split map contains logic that analyzes the "flat file schema" property along with system information about the number of available processors to synthesize the optimal dataflow sub-graph.

The text parse sub-map of FIG. 17 parses the stream of input strings and produces streams of offsets indicating the position of fields within the strings, via a composite output port. The individual element ports of the offsets composite output port are linked to multiple slave maps which extract/convert text into data of specific types.

Each of the slave maps converts a subset of text fields from the stream of input strings. Collectively they provide all output element ports for text split's composite output port and subsequently the composite schema type of the output port.

The design time synthesis process that occurs during map linking allows each map to further synthesize internal dataflow graphs once all the map's input ports have been synthesized. This process is recursive until all dataflow graphs in all maps have synthesized.

B. Join

Figure 18:
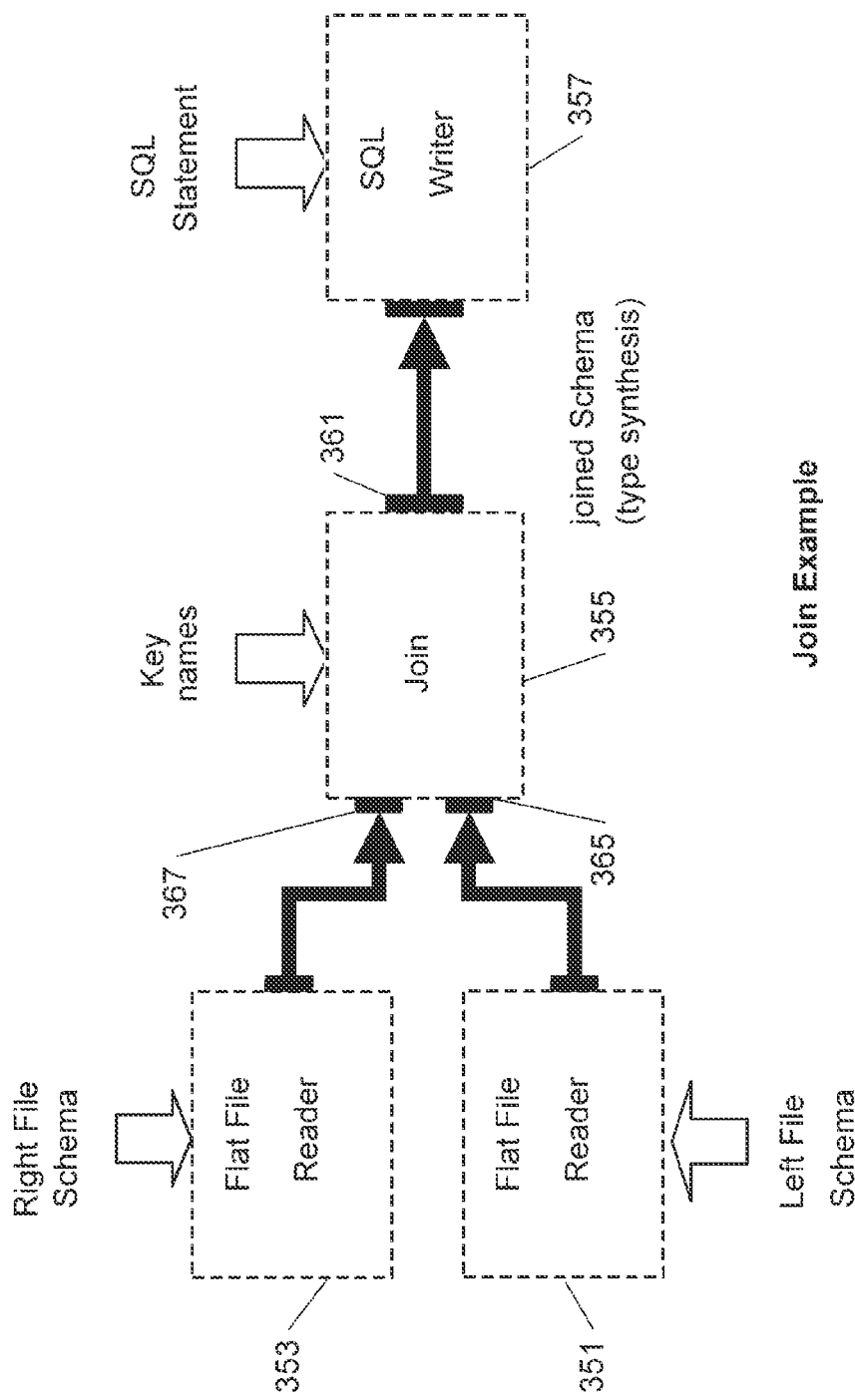
FIG. 18 is a block diagram showing an application that joins data from two flat files.
Figure 19:
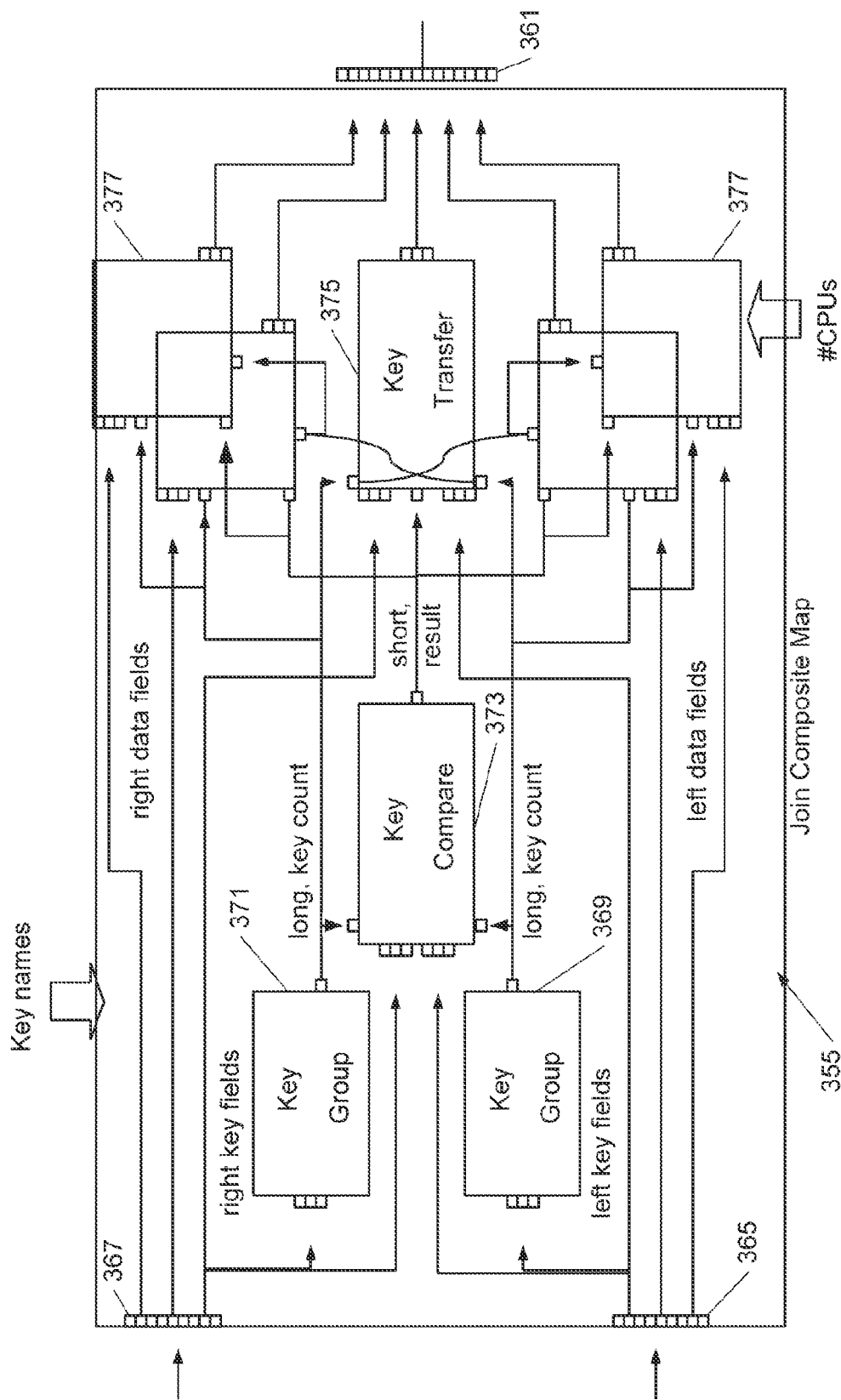
FIG. 19 is a diagram depicting the internal dataflow graph of the Join map of FIG. 18.

FIGS. 18 and 19 illustrate an application that joins the data from two flat files and outputs the resulting dataflow stream into a database. FIG. 18 illustrates an application employing 4 maps. The output ports of flat file reader maps 351,353 are both linked, one left and one right, to the input ports of the join map 355. The join map's output port 361 is linked to the input port of a SQL writer map 357. The appropriate properties are set by the user at design time to sufficiently specify all maps.

The "right file schema" and "left file schema" properties result in the synthesis of the flat file reader maps 351, 353 and their subsequent composite output ports as described in the previous example. The type synthesis process propagates to the join map's composite input ports 365, 367. The join map 355 is then allowed to synthesize its internal dataflow graph and subsequently synthesize the combined or "joined" schema type of its composite output port 361.

The type synthesis process then propagates to the SQL writer map 357. The SQL writer map 357, when called upon to synthesis its internal dataflow graph, can evaluate the query with the backend database to verify and set the schema of its composite input port. This enables type constraint problems to be discovered during the synthesis process at design time rather than execution time.

FIG. 19 details the internal dataflow graph of the join map 355. The "key names" property is utilized by the join map to link the appropriate sub-ports of the left and right composite input ports to the appropriate internal sub-maps.

The key sub-ports of the left composite input port 365 are linked to a key group map 369 to compute the sizes of left side duplicate key groups. The key sub-ports of the right composite input port 367 are linked to another key group map 371 to compute the sizes of right side duplicate key groups. The key sub-ports of both the left and right composite input ports are also linked, one left and one right, to input ports of the key compare 373 and key transfer 375 sub-maps.

The data sub-ports of both the left and right composite input ports 365, 367 are linked to the input ports of multiple slave maps 377 that transfer the data fields. The number of slave maps is determined during the synthesis process using system information about the number of available processors (or threads depending on hardware environment).

The "key count" output ports of the key group sub-maps 369,371 are both linked to input ports of both the key compare map 373 and the key transfer map 375. They are also both linked to input ports of all the left and right data transfer slave maps. The key compare map 373 uses the key counts to only compare the first key of any duplicate key group. The other sub-maps 377, 375 use the key counts to transfer key and data fields.

The "result" output port of the key compare map 373 is linked to input ports on the key transfer map 375 and all of the left and right data transfer slave maps 377. The "result" dataflow, coupled with the left and right "key count" dataflows, is all the information needed to transfer the correct patterns of key and data values to the composite output port 361 of the join map 355.

The collection of output ports from the key transfer map and the left and right transfer slave maps make up the entire composite output port of the join map 355 and subsequently its composite schema type.

It should be noted that the Join algorithm employed by this example assumes the input streams are sorted via the same keys used to join them. Additional logic could be employed by the join map 355 to check for this constraint by first checking the synthesized input port sort schemas to verify they are sorted appropriately. The join map 355 could also employ dynamic logic to synthesize one of several join algorithms depending on the synthesized input schema type.

C. Hierarchical Ports

Figure 20:
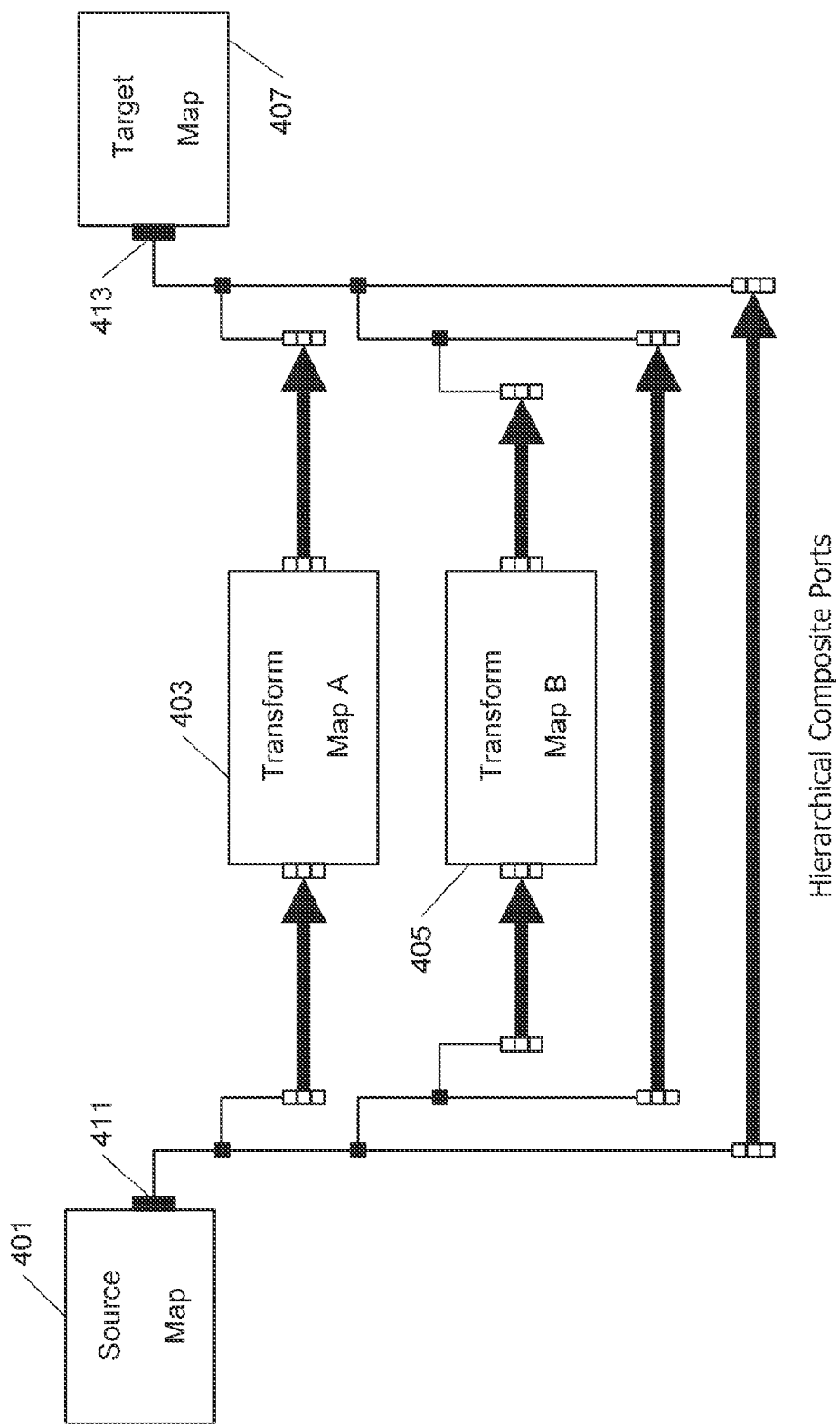
FIG. 20 is a block diagram showing an application using four maps that link sub-ports of a hierarchical composite port.

FIG. 20 illustrates the full flexibility of composite ports. Composite ports are hierarchical collections of ports and as such can be used to transfer any composite pattern of data types.

FIG. 20 illustrates an application employing 4 maps. The source map 401 produces data via a hierarchical composite output port 411. Some of the sub-ports, themselves composite ports, are linked to the input ports of two different user transformation maps 403, 405 with the remaining sub-ports linked to the composite input port of the target map 407. The output ports of the two user transformation maps 403, 405 are also linked to the input port 413 of the target map 407.

The transformation maps 403, 405 can be developed independently based on sub-schemas. As sub-schemas are combined to create composite schemas the components to process the sub-schemas can be reused to rapidly create components to process the composite schemas. This flexible linking process provides for process development scalability and since all maps run in parallel it also provides process execution scalability.

D. Binary Half Adder

Figure 21:
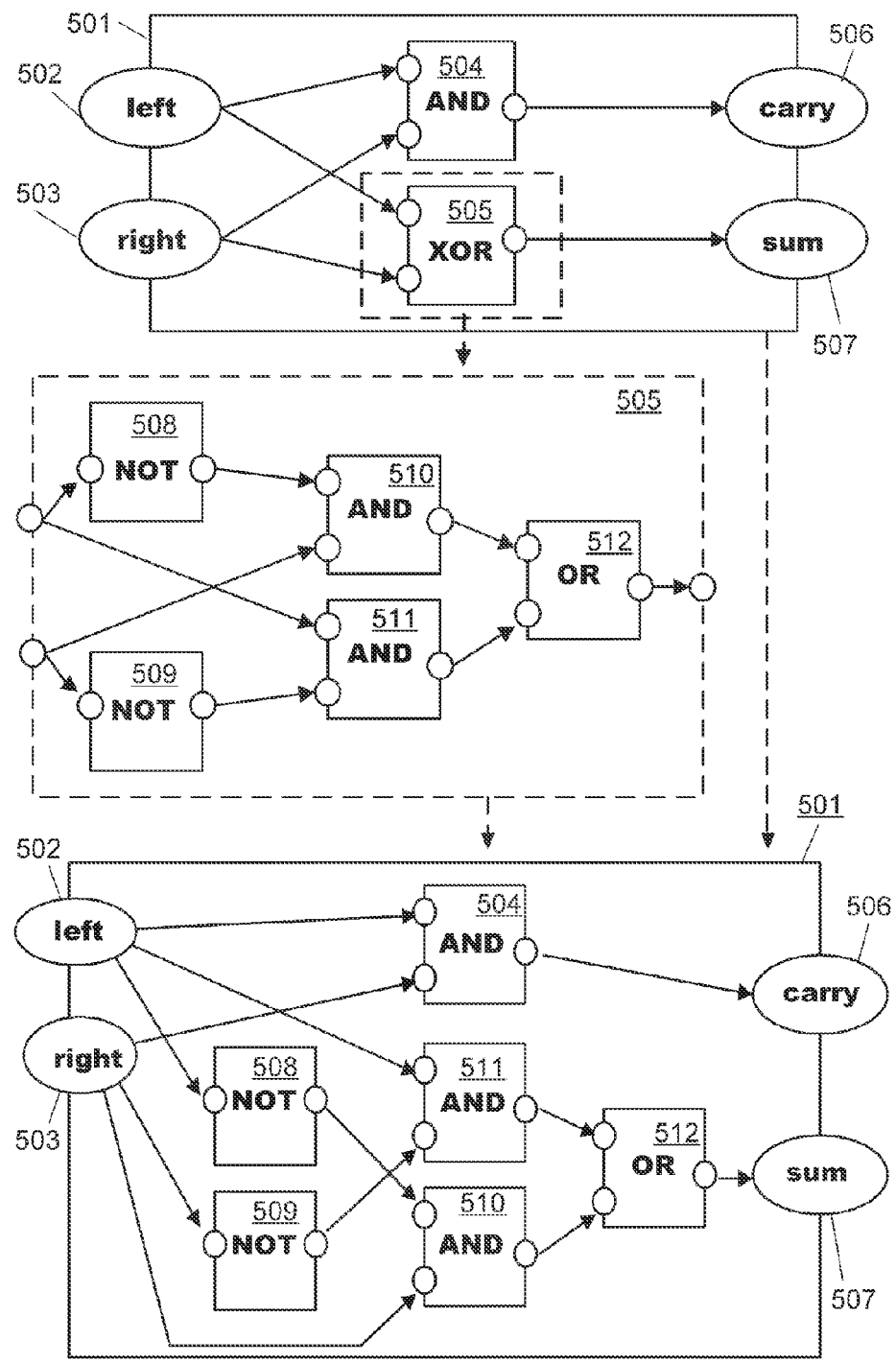
FIG. 21 is a flow diagram showing a hierarchy of maps implementing a binary half-adder as an example of map synthesis using recursion.

FIG. 21 is a process flow diagram for the design and code synthesis of a binary half-adder. Such an example is provided to allow a more detailed description of the recursive process for code synthesis based on the use of hierarchical maps. The design of the process flow diagram depicted in the upper third of FIG. 21 shows the highest-level map of binary half-adder 501. Map 501 accepts data on two data input ports 502 and 503, and the output of half-adder 501 is available on data ports 506 and 507. The functionality of the half-adder is provided by logical AND 504 and logical XOR (exclusive-or) 505. AND 504 is considered a logical primitive and can be compiled directly, but XOR 505 is not a primitive and must be specified at a lower level of the design hierarchy. The compiler 12, thus, is directed to resolve the XOR 505 by descending a level to obtain the map for XOR, which may be already present in the component library 16, or may be designed by the developer. The middle third of FIG. 21 illustrates an exemplary embodiment of XOR 505 at a lower level of design hierarchy directly below the higher level design hierarchy display of binary half-adder 501. As shown in the middle of FIG. 21, XOR 505 may be comprised of logical primitives NOTs 508 and 509, ANDs 510 and 511, and OR 512.

Having resolved the map for the XOR 505, the compiler 12 may now substitute the XOR 505 within binary half-adder 501 with its lower-level map while retaining AND 504. Thus, the compiler 12 may proceed to compile the total half-adder using only logical primitives. The designer may thus work at a relatively high level of representation as shown in the upper part of FIG. 21. In addition, the recursion of the code synthesis process allows the lower-level details of the middle and bottom maps of FIG. 21 to be implemented without the need for the designer to be distracted by these lower-level details. For functions not found in the library 16, the designer is prompted by the compiler 12 to specify these as necessary, but in general the efficiency of extensive code re-use is provided by these means, with the designer's attention directed to only those functions where effort is required. The map 501 in the upper third of FIG. 21 is easier for the designer to conceptualize and work with then the more complex map 501 in the bottom third of FIG. 21. The binary half-adder depicted in FIG. 21 is a simple example to illustrate the principle and benefits of the system described herein. As such, the system described herein is not necessarily restricted to the design depicted in FIG. 21. In particular, the system described herein may have a different process flow diagram, such as one with a more complex design.

E. Partitioned Parallelism

FIGS. 22-26 illustrate how maps may be used as templates. The hyper map is one such map that is utilized to implement partitioned parallelism. The following examples show how the hyper map can adopt and partition another map's interface and implementation.

Figure 22:
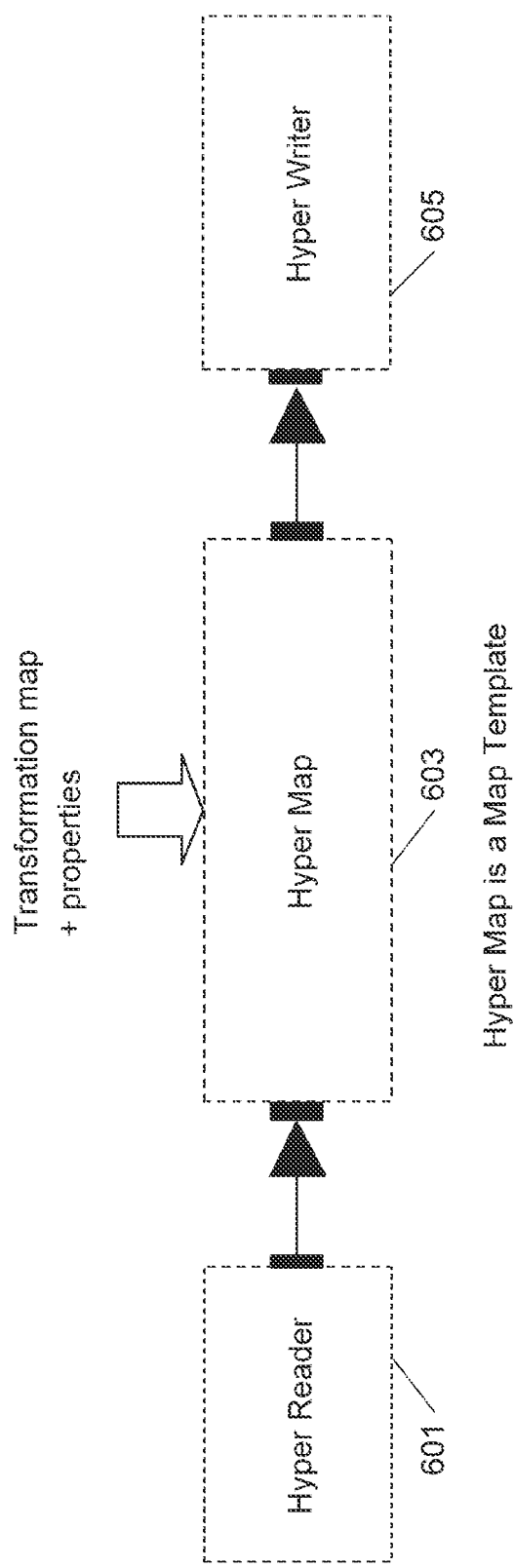
FIG. 22 is a functional diagram illustrating an application with three maps wherein one map is a map template that takes as a property another map.

FIGS. 22-24 illustrate an application employing three maps 601, 603, 605. The hyper map 603 serves as a map template and when first dragged into the design, has no ports. The user configures hyper map's properties with the name of a transformation map and it's properties. Upon configuration the hyper map 603 synthesizes composite ports matching those of the specified transformation map except in one respect. hyper map's ports have an additional level of hierarchy representing multiple dimensions or partitions.

The output port of the hyper reader map 601 is then linked to the newly synthesized input port of the hyper map 603. The output port of the hyper map 603 is then linked to the input port of the hyper writer map 605.

FIG. 23 shows how the dataflow synthesis process allows the hyper reader map 601 to synthesize its internal, partitioned dataflow graph. Type synthesis results in the partitioned schema of the hyper reader map's output port 607 to propagate to the input port 609 of the hyper map 603.

Hyper map 603 then synthesizes its internal dataflow graph by linking a separate instance of the user specified transformation map to each sub-port in the top hierarchical level of the hyper map's composite input port 609. The output port of each transformation map is likewise linked to the top hierarchical level of the hyper map's composite output port 611.

Type synthesis results in the partitioned schema of the hyper map's output port 611 to propagate to the input port 613 of the hyper writer map 605. The hyper writer map 605 then synthesizes its internal, partitioned dataflow graph. If a type constraint issue is encountered such as incompatible partition schemas then the user is notified and additional components can be utilized to correct the mismatch. In this case it was successful so the partition schema matched from source to target.

FIG. 24 shows how the dataflow synthesis process eliminates design time composite map links. A composite map is a wrapper around an internal dataflow graph consisting of a collection of sub-maps. All composite maps and their subsequent links are dropped during the synthesis process leaving only scalar maps linked directly to each other. The result is a design process that treats partitioned data as a single, schema typed stream, yet at execution time produces independent streams that can be processed in parallel.

Figure 25:
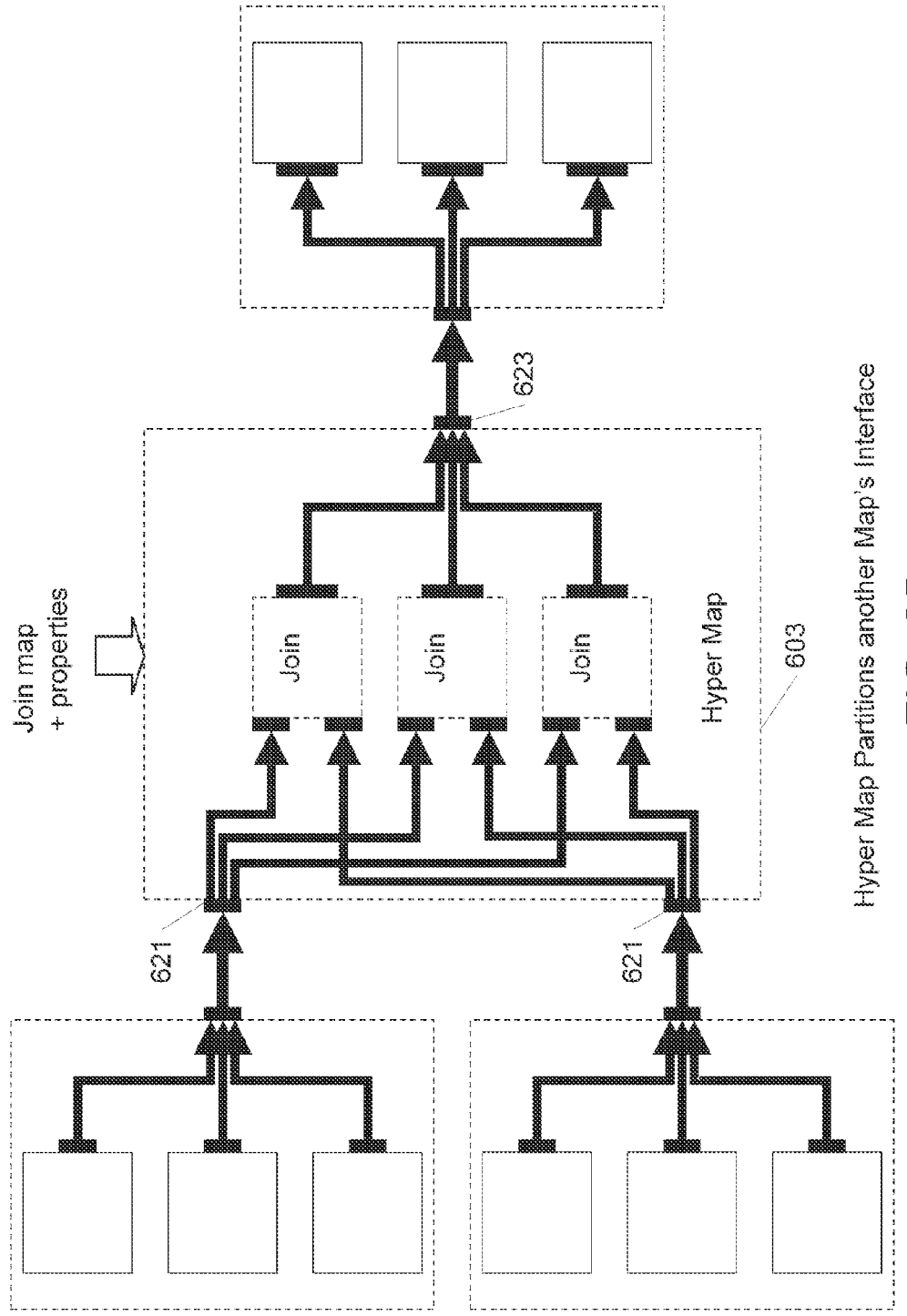
FIG. 25 is a block diagram showing an implementation of a partitioned join.
Figure 26:
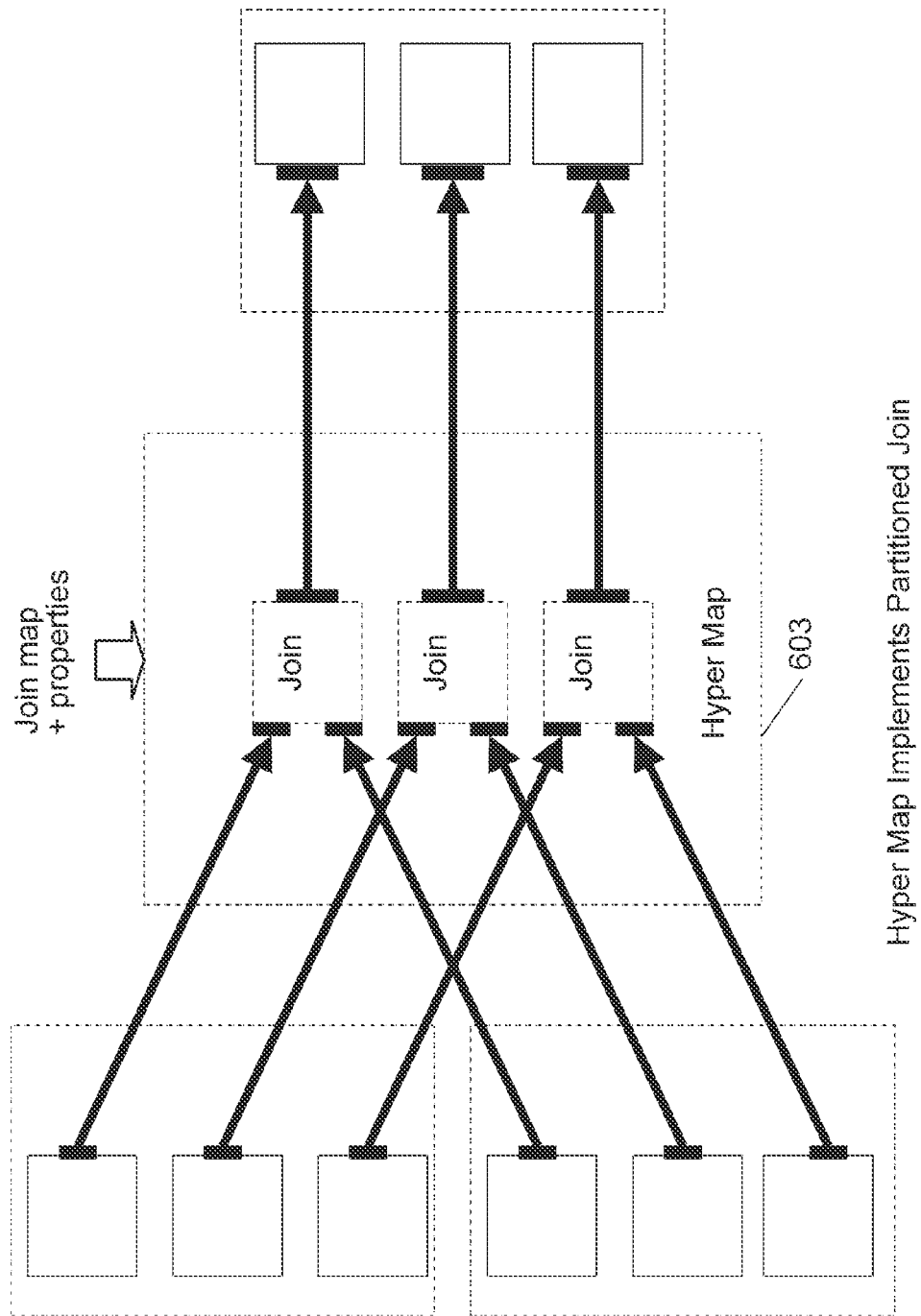
FIG. 26 is a block diagram illustrating the elimination of design time map links from FIG. 25.

FIG. 25 shows how the hyper map 603, leveraging the flexibility of the framework, can work with any map. Hyper map in this case has transformed into a hyper join by adopting and partitioning the specified join map's interface of two input ports 621 and a single output port 623. The dimensions of the input ports determine the dimensions of the hyper map 603. If they don't match, then hyper map 603 generates a type mismatch error and the user can utilize additional map components to correct the problem.

It should be noted that in the case of join, additional schema constraints exist beyond matching partition parity. If the dataflow streams are hash partitioned then the left and right partitioned inputs must be hashed using the same keys. Adding an additional composite wrapper map around the hyper map 603 could create a more robust, flexible version of a hyper join map. This new version of hyper join could inspect the input port partition schemas to implement the constraint. It could alternatively synthesize additional map components to reparation one of the input dataflow streams or generate a completely different join algorithm depending on input synthesis.

FIG. 26 shows again how the synthesis process drops composite map links to produce a partitioned join where each partition is independently joined in parallel. If additional levels of composite map wrappers had been implemented such as the more robust hyper join discussed in FIG. 25, the end result is that only the scalar maps and their subsequent links are retained for execution.

Also note that the join map replicated multiple times by the hyper map 603 is itself a composite map. Its internal dataflow graph as depicted in an earlier example is also replicated multiple times providing multiple dimensions of parallelism.

F. Repartition

Figure 27:
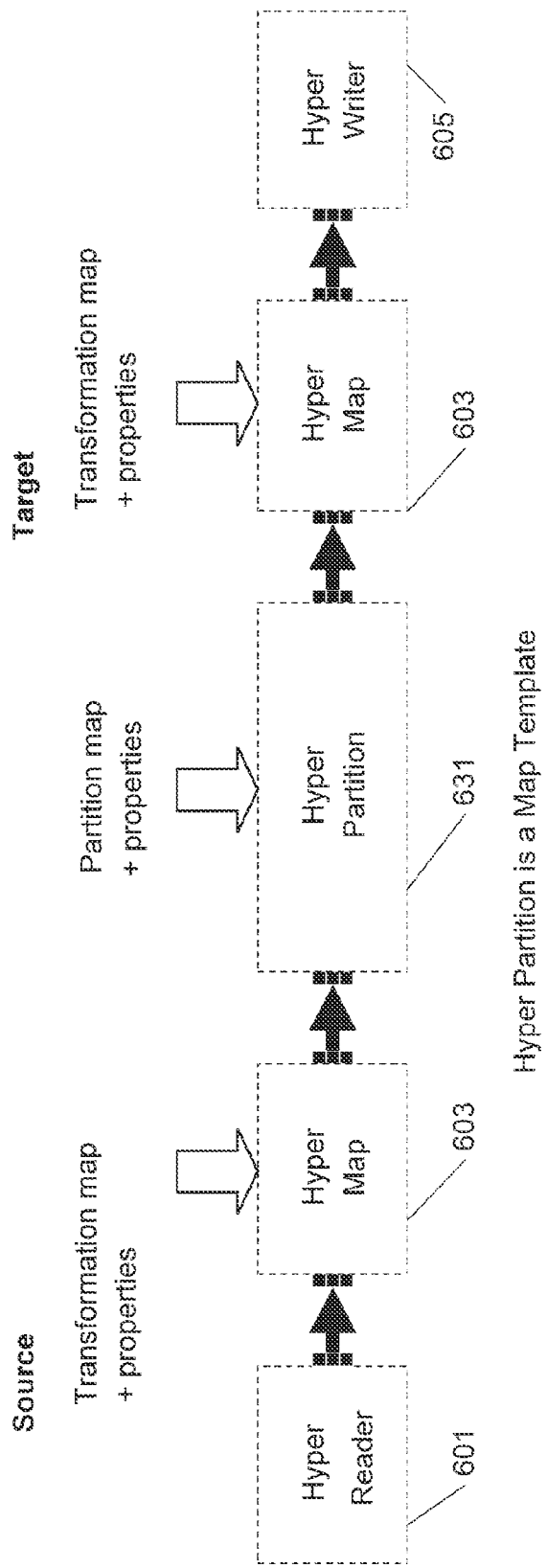
FIG. 27 is a functional diagram of an application employing five maps with differing data partitioning schemes.

FIG. 27 illustrates another use of a template map. The hyper partition map 631 is another such map that is utilized to transform partition schema to correct partition schema mismatch.

In this example, a partitioned data source is read by a source map and then processed by a source transformation map that is dependent on the source partition schema. The stream is then repartitioned and processed by a target transformation that is dependent on the target partition schema. The data is then passed to a partitioned target map.

FIG. 27 illustrates an application employing five maps. The hyper reader map 601 is linked to a hyper map 603 specified with a transformation map that is dependent on the source partition schema. The hyper writer map 605 is linked to another hyper map 603 specified with a transformation map that is dependent on the target partition schema. If these two dataflow graphs were to be linked directly it would result in a partition schema type mismatch.

The user then configures hyper partition map's properties with the name of a partition map and it's properties. Upon configuration, the hyper partition map 631 synthesizes a single composite input port and a single composite output port. The partition schema of the output port is dependent on the specified partition map and its properties.

The output port of the hyper source transformation map is linked to the input port of the hyper partition map. The output port of the hyper partition map is then linked to the input port of the hyper target transformation map.

FIG. 28 illustrates again how the synthesis process works. The partition schema of the hyper reader 601 map's output port propagates to the input port of the hyper target transformation map 603. It then synthesizes its internal, partitioned dataflow graph and subsequent composite output schema and so on.

When the type synthesis process reaches the hyper partition map 631, it synthesizes its internal dataflow graph by linking a separate instance of the user specified partition map to each sub-port in the top hierarchical level of the hyper partition map's composite input port. A separate instance of a generic merge map is likewise connected to each sub-port in the top hierarchical level of the hyper partition map's composite output port. Each instance of the specified partition map is linked to every instance of the merge map such that the each sub-port in a partition map's composite output port is linked to a separate merge map. The partition schema links are now "type correct." The hyper partition map's synthesized output schema matches that of the hyper writer map 605.

The synthesis process drops composite map links to produce partitioned, parallel dataflow streams. The hyper partition map 631 can be utilized to partition a non-partitioned stream (partition parity 1 to n), reparation a partitioned stream (partition parity n to m), and unpartition a partitioned stream (partition parity n to 1).

Figure 28:
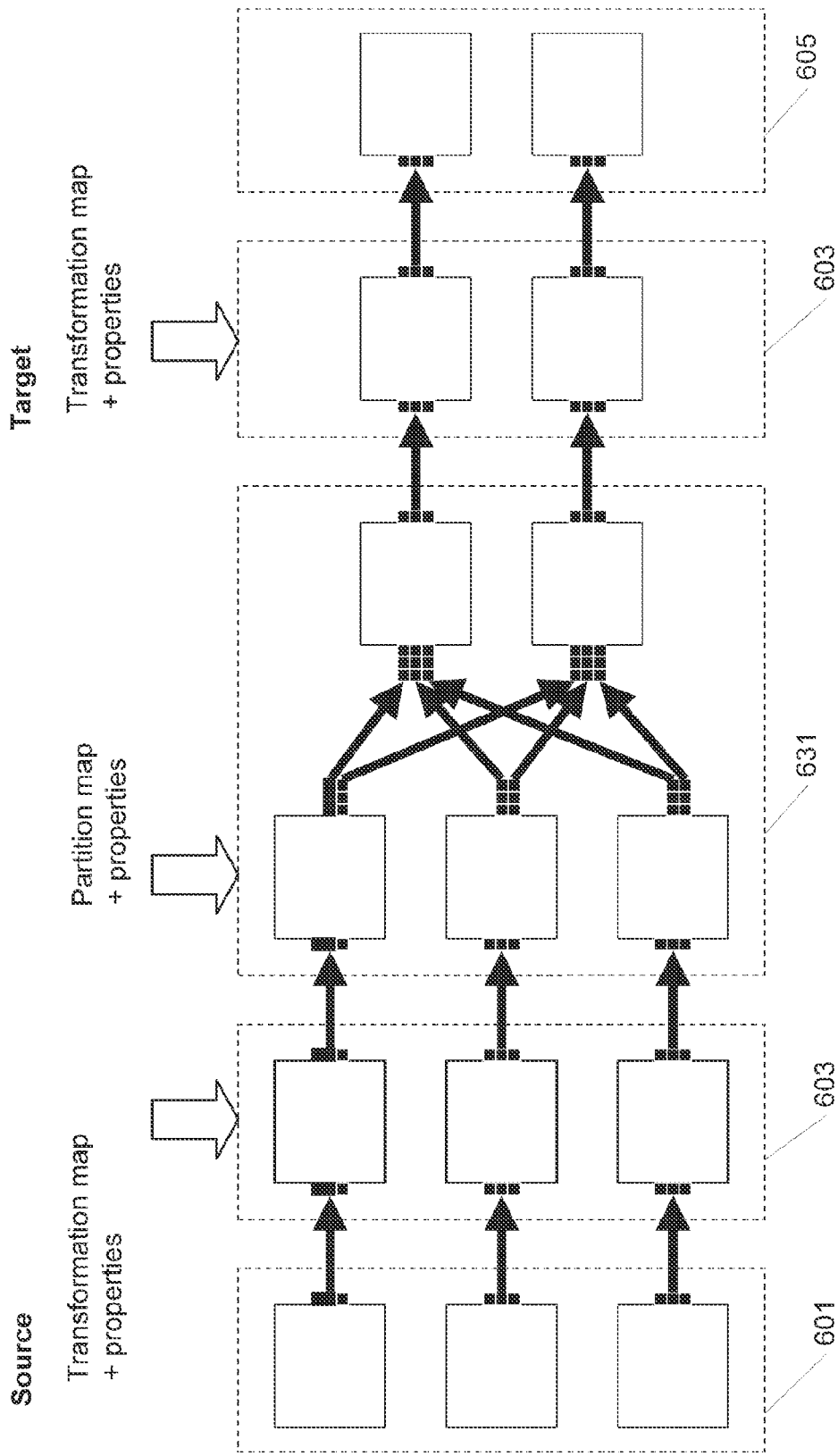
FIG. 28 is a block diagram illustrating a synthesis process applied to FIG. 27 correcting schema mismatch.
Figure 29:
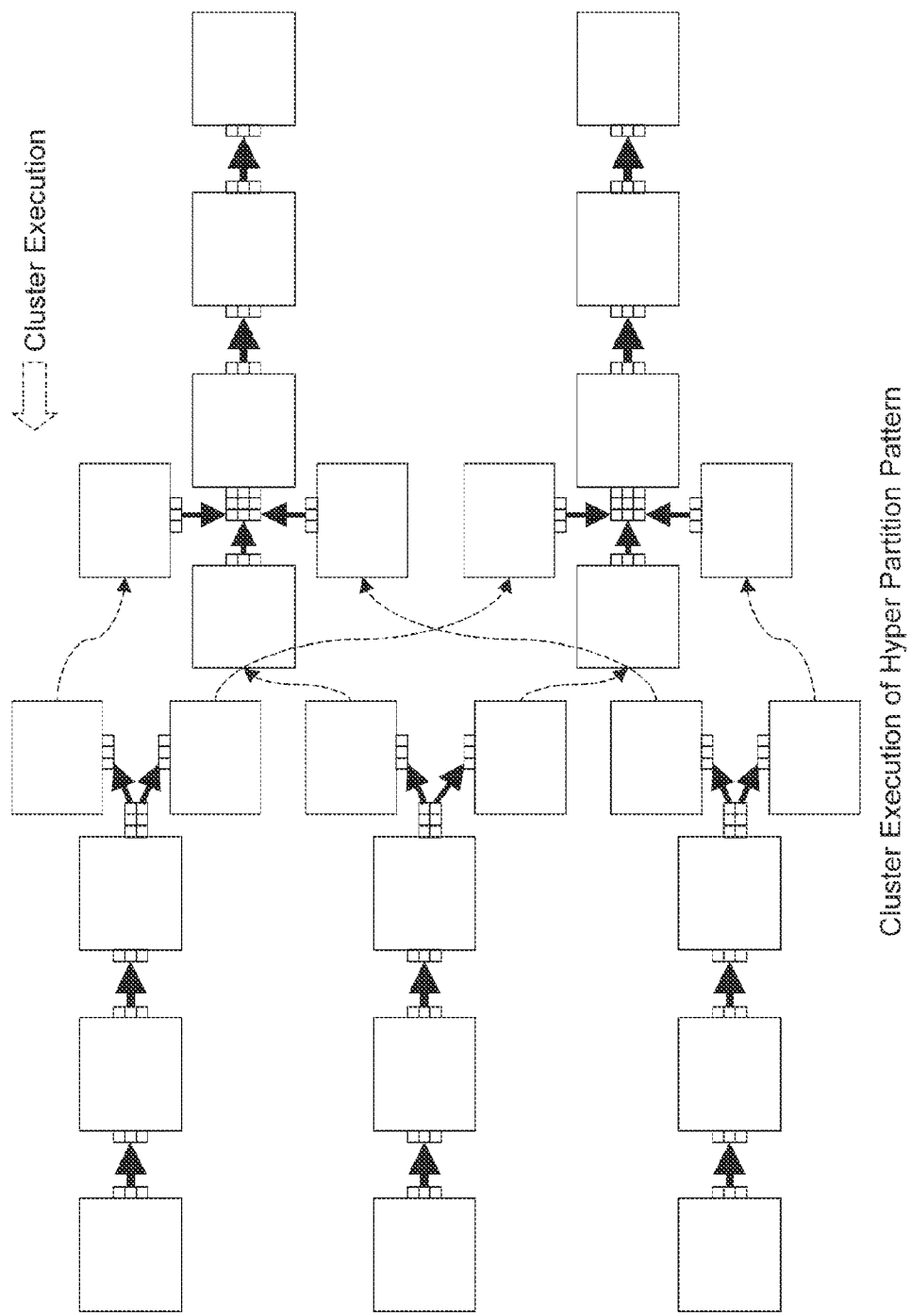
FIG. 29 is a block diagram showing the pattern generated from the synthesis process applied to FIG. 27 when executing on a cluster.

FIG. 29 illustrates how the hyper partition pattern generated in FIG. 28 can be modified by the framework to execute in a cluster environment. In this case additional maps are inserted at the links between the multiple partition maps and the multiple merge maps. These additional maps serialize/deserialize the dataflows and extend the dataflow links over communication links to allow the maps to be farmed out over a cluster of computers. In this example five cluster nodes are utilized, one for each partition of the source dataflow stream and one for each partition of the target data flow stream.

It will be appreciated to those skilled in the art having the benefit of this disclosure that this invention is believed to provide a system and method for synthesizing executable code from graphical dataflow maps. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the data management system and scope of the invention as described in the following claims.

What is claimed:

1. A method for executing a dataflow application comprising:
   providing a dataflow application comprising a plurality of map components and data ports, wherein a number of the map components are linked between data ports, wherein the map components each comprise one or more map processes, and wherein some of the map components comprise composite components having a plurality of processes;
   allocating a processing thread to each map process; and
   executing each map process on a separate thread.

2. The method of claim 1, including generating a prepared map of the dataflow application and assigning runtime properties to the prepared map prior to execution.

3. The method of claim 1, certain map components including input ports and output ports and the executing step including reading data tokens from respective input ports and writing data tokens to respective output ports.

4. The method of claim 1, including choosing port implementations to a specific data type prior to said executing step.

5. The method of claim 1, some of the ports being hierarchical comprising a plurality of hierarchical ports and the data being partitioned for parallel processing.

6. The method of claim 1, including transporting data tokens among the map processes.

7. The method of claim 6, including batching the data tokens to regulate a length of time a map process may execute without synchronization.

8. The method of claim 1, including ports associated with each map process for representing and transporting multi-state null value tokens.

9. The method of claim 8, the null value tokens including an error null.

* * * * *